(12) United States Patent
Venetianer et al.

(10) Patent No.: US 11,205,314 B2
(45) Date of Patent: Dec. 21, 2021

(54) SYSTEMS AND METHODS FOR PERSONALIZED INTENT PREDICTION

(71) Applicant: Motorola Solutions, Inc., Chicago, IL (US)

(72) Inventors: Peter L. Venetianer, McLean, VA (US); Pietro Russo, Melrose, MA (US); John B. Preston, Plantation, FL (US); Shervin Sabripour, Plantation, FL (US)

(73) Assignee: Motorola Solutions, Inc., Chicago, IL (US)

( * ) Notice: Subject to any disclaimer, the term of this patent is extended or adjusted under 35 U.S.C. 154(b) by 42 days.

(21) Appl. No.: 15/930,848

(22) Filed: May 13, 2020

(65) Prior Publication Data

US 2021/0358250 A1 Nov. 18, 2021

(51) Int. Cl.
*G07C 9/37* (2020.01)
*G06N 7/00* (2006.01)
(Continued)

(52) U.S. Cl.
CPC ............ *G07C 9/37* (2020.01); *G06F 16/285* (2019.01); *G06K 9/00342* (2013.01); *G06K 9/00771* (2013.01); *G06K 9/6202* (2013.01); *G06N 7/00* (2013.01); *G06N 20/00* (2019.01); *G06Q 50/01* (2013.01)

(58) Field of Classification Search
None
See application file for complete search history.

(56) References Cited

U.S. PATENT DOCUMENTS

| 8,473,420 B2 | 6/2013 | Bohus et al. |
| 2006/0187037 A1* | 8/2006 | Eubelen ................ E05F 15/73 340/552 |

(Continued)

OTHER PUBLICATIONS

Jie-Ci Yang et al., "An Intelligent Automated Door Control System Based on a Smart Camera" ISSN 1424-8220, Sensors 2013, 13, 5923-5936, Mar. 15, 2013

(Continued)

*Primary Examiner* — Thomas S McCormack
(74) *Attorney, Agent, or Firm* — Baker Botts L.L.P.

(57) ABSTRACT

Systems for personalized intent prediction may perform a process including receiving image data depicting the behavior of a person on approach toward a secure location, generating intent data including data representing a current trajectory of the person on the current approach, comparing the intent data with a personal statistical model for the person that includes data representing trajectories associated with historical approaches by the person toward the secure location and respective result data indicating whether the historical approach resulted in the person entering the secure location, determining, dependent on the comparing, a personalized intent score representing a likelihood that the person intends to enter the secure location on the current approach, and pre-emptively enabling, or refraining from pre-emptively enabling, entry to the secure location prior to the person reaching the secure location based on whether the personalized intent score meets or exceeds a predetermined minimum confidence threshold for enabling entry.

20 Claims, 9 Drawing Sheets

(51) Int. Cl.
*G06N 20/00* (2019.01)
*G06K 9/00* (2006.01)
*G06Q 50/00* (2012.01)
*G06K 9/62* (2006.01)
*G06F 16/28* (2019.01)

(56) References Cited

U.S. PATENT DOCUMENTS

2018/0018508 A1* 1/2018 Tusch ................ G06K 9/00771
2018/0334357 A1* 11/2018 Finn ...................... B66B 1/2408
2019/0358820 A1   11/2019 Wojciechowski et al.

OTHER PUBLICATIONS

Matjaz Gams et al., "Intelligent High-Security Access Control" Informatica 31 (2007) 469-477, Jul. 12, 2007.

* cited by examiner

SYSTEMS AND METHODS FOR PERSONALIZED INTENT PREDICTION

BACKGROUND OF THE INVENTION

Traditional authentication systems for controlling access to secure locations or restricted computing systems or other restricted equipment use cards and card readers to determine when to grant access. In these systems, determining whether a particular user intends to access a secure location or restricted equipment is relatively straightforward. If the user is at an entry point for a secure location or is standing near restricted equipment and swipes their card, the card swipe indicates an intent to access the location or equipment. Some newer systems employ long distance biometrics such as facial recognition technology or wireless keys to determine whether a particular person should be granted access. In these systems, which are sometimes referred to as frictionless access control systems or contactless access control systems, determining whether a user intends to access a secure location or restricted equipment is not as straightforward. The user's credentials, such as their face or a Bluetooth token, can be recognized far in advance of the user reaching an entry point for the location or reaching the equipment.

To effectively control access to a secure location or restricted equipment, it may be important to know whether an authenticated person actually intends to access the secure location or restricted equipment and to only grant access only in that case. For example, a door may be opened only when an authenticated person intends to enter a secure location. Unlocking the door when the person is just walking by can be a security risk in that others could enter the unlocked door without the authenticated person even realizing it. In addition, unnecessarily unlocking the door too often may cause excessive noise or can result in excessive wear on mechanical parts of an access-control system associated with the secure location. Existing solutions for trajectory-based intent detection, which are based on aggregated data representing typical trajectories for all people, can be highly error prone, since not all people behave in the same way even in identical circumstances.

BRIEF DESCRIPTION OF THE SEVERAL VIEWS OF THE DRAWINGS

In the accompanying figures, the same or similar reference numerals may be repeated to indicate corresponding or analogous elements. These figures, together with the detailed description below, are incorporated in and form part of the specification, and serve to further illustrate various embodiments of concepts that include the claimed invention, and to explain various principles and advantages of those embodiments.

Figure 1:
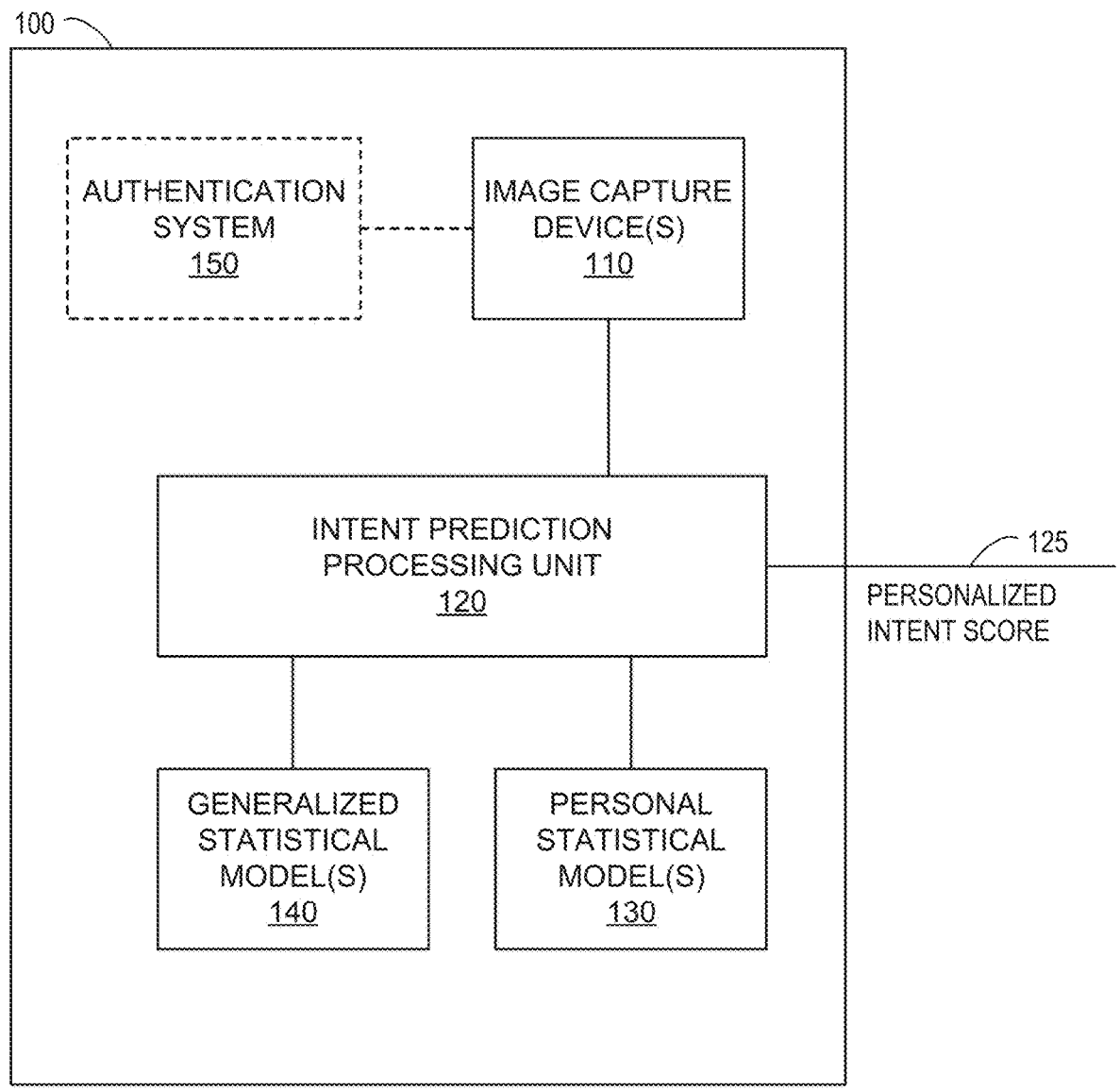
FIG. 1 is a block diagram illustrating selected elements of a system for personalized intent prediction, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and process components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and processes for personalized intent prediction. In some embodiments, the disclosed systems and processes may be used to predict whether a person intends to enter a controlled-access location. In one embodiment, a disclosed process includes receiving, from an image capture device associated with an access-controlled location, first image data depicting behavior of a first person on a current approach by the first person toward the access-controlled location, generating, based on the received first image data, first intent data including data representing a current trajectory of the first person toward the access-controlled location on the current approach, comparing the first intent data with a personal statistical model for the first person, the personal statistical model for the first person including data representing one or more trajectories associated with respective historical approaches by the first person toward the access-controlled location and respective result data indicating, for each of the one or more trajectories, whether the historical approach resulted in the first person entering the access-controlled location, determining, dependent on the comparing, a first personalized intent score for the first person, the first personalized intent score representing a likelihood that the first person intends to enter the access-controlled location on the current approach, and enabling entry to the access-controlled location in response to the first personalized intent score meeting or exceeding a predetermined minimum confidence threshold for enabling entry.

In some embodiments, the method may further include, prior to generating the first intent data, determining an identity of the first person or determining that the first person is authorized to enter the access-controlled location. The method may also include obtaining non-trajectory-based information associated with the first person. Determining the first personalized intent score for the first person may be further dependent on the obtained non-trajectory-based information associated with the first person.

In some embodiments, the personal statistical model for the first person may include data representing multiple similar trajectories that are associated with respective historical approaches by the first person toward the access-controlled location and identical result data, and that are aggregated into respective ones of one or more cluster of trajectories based on the obtained non-trajectory-based information associated with the first person. Comparing the first intent data with the personal statistical model for the first person may include comparing the first intent data with data representing at least one of the one or more clusters of trajectories. In some embodiments, the method may further include determining an update action with which to update the personal statistical model for the first person, where determining the update action includes determining whether the first intent data, the non-trajectory-based information associated with the first person, and result data indicating whether or not the first person entered the access-controlled location on the current approach are similar to the data representing the multiple similar trajectories that are associated with respective historical approaches, non-trajectory-based information associated with the first person and with trajectories in a given one of the one or more clusters of trajectories, and result data associated with the data representing the multiple similar trajectories in the given cluster, and performing the determined update action. The determined update action may include aggregating the first intent data into the data representing the multiple similar trajectories in the given cluster, or creating a new cluster including the first intent data and including the non-trajectory-based information associated with the first person.

In some embodiments, the method may further include storing, in association with the first intent data, score data representing the first personalized intent score for the first person and result data indicating whether or not the first person entered the access-controlled location on the current approach, and updating the personal statistical model for the first person based on the first intent data, the score data, and the result data.

In some embodiments, the method may further include receiving, from the image capture device associated with the access-controlled location, second image data depicting behavior of a second person on a current approach by the second person toward the access-controlled location, generating, based on the received second image data, second intent data including data representing a current trajectory of the current approach of the second person toward the access-controlled location, the current trajectory of the current approach of the second person being similar to the current trajectory of the current approach of the first person, comparing the second intent data with a personal statistical model for the second person, determining, dependent on a result of comparing the second intent data with the personal statistical model for the second person, a second personalized intent score for the second person, the second personalized intent score representing a likelihood that the second person intends to enter the access-controlled location on the current approach, and refraining from enabling entry to the access-controlled location in response to the second personalized intent score failing to meet or exceed the predetermined minimum confidence threshold for enabling entry.

In one embodiment, a disclosed system for personalized intent prediction includes an image capture device associated with an access-controlled location, a processor, and a memory. The memory stores program instructions that when executed by the processor cause the processor to perform receiving, from the image capture device, first image data depicting behavior of a first person on a current approach by the first person toward the access-controlled location, generating, based on the received first image data, first intent data including data representing a current trajectory of the first person toward the access-controlled location on the current approach, comparing the first intent data with a personal statistical model for the first person, the personal statistical model for the first person including data representing one or more trajectories associated with respective historical approaches by the first person toward the access-controlled location and result data indicating, for each of the one or more trajectories, whether the historical approach resulted in the first person entering the access-controlled location, determining, dependent on the comparing, a first personalized intent score for the first person, the first personalized intent score representing a likelihood that the first person intends to enter the access-controlled location on the current approach, enabling entry to the access-controlled location in response to the first personalized intent score meeting or exceeding a predetermined minimum confidence threshold for enabling entry, and refraining from enabling entry to the access-controlled location in response to the first personalized intent score failing to meet or exceed the predetermined minimum confidence threshold for enabling entry.

In some embodiments, when executed by the processor, the program instructions may further cause the processor to perform obtaining non-trajectory-based information associated with the first person. Determining the first personalized intent score for the first person may be further dependent on the obtained non-trajectory-based information associated with the first person. In some embodiments, when executed by the processor, the program instructions may further cause the processor to perform storing, in association with the first intent data, score data representing the first personalized intent score for the first person and result data indicating whether or not the first person entered the access-controlled location on the current approach, and updating the personal statistical model for the first person based on the first intent data, the score data, and the result data. In some embodiments, when executed by the processor, the program instructions may further cause the processor to implement a neural network or machine learning model trained to perform personalized intent prediction.

In one embodiment, a disclosed non-transitory, computer-readable storage medium has program instructions stored thereon that when executed by an electronic processor cause the electronic processor to perform receiving, from an image capture device associated with an access-controlled location, first image data depicting behavior of a first person on a current approach by the first person toward the access-controlled location, generating, based on the received first image data, first intent data including data representing a current trajectory of the first person toward the access-controlled location on the current approach, comparing the first intent data with a personal statistical model for the first person, the personal statistical model for the first person including data representing one or more trajectories associated with respective historical approaches by the first person toward the access-controlled location and result data indicating, for each of the one or more trajectories, whether the historical approach resulted in the first person entering the access-controlled location, determining, dependent on the comparing, a first personalized intent score for the first person, the first personalized intent score representing a likelihood that the first person intends to enter the access-controlled location on the current approach, enabling entry to the access-controlled location in response to the first personalized intent score meeting or exceeding a predetermined minimum confidence threshold for enabling entry, and refraining from enabling entry to the access-controlled location in response to the first personalized intent score failing to meet or exceed the predetermined minimum confidence threshold for enabling entry.

In some embodiments, when executed by the electronic processor, the program instructions may further cause the electronic processor to perform obtaining non-trajectory-based information associated with the first person. Determining the first personalized intent score for the first person may be further dependent on the obtained non-trajectory-based information associated with the first person. In some embodiments, when executed by the electronic processor, the program instructions may further cause the electronic processor to perform storing, in association with the first intent data, score data representing the first personalized intent score for the first person and result data indicating whether or not the first person entered the access-controlled location on the current approach, and updating the personal statistical model for the first person based on the first intent data, the score data, and the result data. In some embodiments, when executed by the electronic processor, the program instructions may further cause the electronic processor to implement a neural network or machine learning model trained to perform personalized intent prediction.

In some embodiments, for each of the one or more trajectories associated with respective historical approaches by the first person toward the access-controlled location, the personal statistical model for the first person may further include one or more of historical temporal information indicating a date associated with the historical approach, a day of the week associated with the historical approach, or a time of day associated with the historical approach, historical group approach information indicating whether any other person or persons accompanied the first person on the historical approach, and historical group identification information indicating a respective identity for each of one or more other persons who accompanied the first person on the historical approach. In some embodiments, the obtained non-trajectory-based information associated with the first person may include one or more of access group information indicating a group of users having common access rights with respect to the access-controlled location that includes the first person, current temporal information indicating a date associated with the current approach, a day of the week associated with the current approach, or a time of day associated with the current approach, current group approach information indicating whether any other person or persons accompany the first person on the current approach, and current group identification information indicating a respective identity for each of one or more other persons accompanying the first person on the current approach. In some embodiments, the obtained non-trajectory-based information associated with the first person may include contextual information associated with the current approach by the first person, including one or more of calendar information indicating that the first person is likely to be present in the access-controlled location at a given time, an email-based communication, text-based communication, or voice-based communication indicating that the first person is likely to be present in the access-controlled location at a given time, and a social media post indicating that the first person is likely to be present in the access-controlled location at a given time.

In some embodiments, the first intent data may further include data representing a gaze or pose of the first person associated with the current approach by the first person toward the access-controlled location, and the personal statistical model for the first person may further include data representing gazes or poses of the first person associated with the respective historical approaches by the first person toward the access-controlled location.

In some embodiments, the determined first personalized intent score may be different than a generalized intent score determined for each of multiple persons other than the first person based on respective trajectories of the multiple other persons toward the access-controlled location on respective approaches that are similar to the current trajectory of the first person toward the access-controlled location on the current approach, the generalized intent score having been determined using a generalized statistical model in which the respective trajectories of the multiple other persons are aggregated in a cluster of trajectories associated with the respective approaches.

In some embodiments, comparing the first intent data with a personal statistical model for the first person, determining a personalized intent score for the first person, and updating the personal statistical model for the first person may be performed using a neural network or machine learning model trained to implement personalized intent prediction.

The systems and processes described herein for personalized intent prediction may, in various embodiments, exhibit improved prediction performance compared to existing intent prediction methods and may be performed in real time. These systems and processes may be particularly beneficial when used in so-called frictionless access control systems or contactless access control systems that employ long distance biometrics such as facial recognition technology or wireless keys to determine whether a particular person is authorized to access a secure location or restricted equipment. For example, because the person is not required to take any action in order to present their credentials, the fact that they have not taken any action to present their credentials does not provide any clue as to their intent. When used in conjunction with identification and authentication systems that determine if a particular person is authorized to access a secure location or restricted equipment, the systems and processes described herein may be used to determine when and whether it is appropriate to pre-emptively enable access to the secure location or restricted equipment by more accurately predicting whether the particular person intends to access the secure location or restricted equipment than is possible using existing intent prediction methods.

In various embodiments, the personalized intent prediction systems described herein may employ Artificial Intelligence (AI) and Machine Learning (ML) techniques that enable performance improvements over existing intent prediction methods. For example, in some embodiments, a neural network or machine learning model may be trained to more accurately predict, based on personal statistical models, whether a particular person intends to enter a secure location or access restricted equipment than when using existing intent prediction techniques that are based solely on aggregated trajectory information associated with multiple persons. The neural network or machine learning model may be trained over a myriad of statistical, historical, temporal, and contextual information associated with historical approaches by the particular person to determine whether the particular person intends to enter the secure location or access the restricted equipment on a detected approach. Unlike with existing intent prediction methods, the personalized intent prediction systems described herein explicitly model and predict the intent of individual users based on learned approach behaviors matched with their identities, providing an extra layer of security for access control systems.

In at least some embodiments, the systems and methods described herein may provide personalized intent prediction using one or more image capture devices to capture image data depicting the behavior of a particular person on approach toward a secure location or restricted equipment. In at least some embodiments, the image data may be analyzed to detect, identify, and authenticate the person on approach. As described in more detail below, if the person is determined to be authorized to enter the secure location or access the restricted equipment, the image data may be further analyzed to generate intent data to be used in predicting the person's intent. The intent data may include trajectory data, gaze data, pose data, or other behavioral data. Non-trajectory-based information may also be obtained and taken into consideration when predicting the person's intent. The non-trajectory-based information may include temporal information, group approach information, group identification information, or contextual information associated with the person or with the current approach by the person toward the secure location or restricted equipment.

In at least some embodiments, a personalized intent score may be generated based on a comparison between the intent data and non-trajectory-based information associated with a current approach and information associated with historical approaches by the person that are maintained in a personal statistical model for the person. The personal statistical model may be trained to recognize typical behaviors of, and patterns associated with, the person when on approach toward a secure location or restricted equipment and to determine how often those behaviors are associated with entering the secure location or accessing the restricted equipment. For example, the statistical model may be trained based on trajectory data and non-trajectory-based information associated with various historical approaches and corresponding access logs indicating, for each such approach by the person, whether or not the person entered the secure location or accessed the restricted equipment. A personalized intent score may be generated dependent on a statistical prediction of the person's destination based on historical trajectories for that person, temporal predictions based on the time of day or time windows associated with other accesses by the person, observed patterns of behavior by the person when accompanied by other people while on approach, typical sequences of events while the person is on approach, user group memberships and access rights, and other information associated with the person and the secure area or restricted equipment, as reflected in the personal statistical model. The personalized intent score may represent the likelihood that the person intends to enter the secure location or access the restricted equipment and may inform a decision about when and whether to pre-emptively enable access to the secure location or restricted equipment prior to the person reaching the secure location or restricted equipment. An example system for personalized intent prediction is illustrated in FIG. 1 and described below.

Each of the above-mentioned embodiments will be discussed in more detail below, starting with example system and device architectures of the system in which the embodiments may be practiced, followed by an illustration of processing blocks for achieving an improved technical method, device, and system for performing personalized intent prediction. Example embodiments are herein described with reference to flowchart illustrations and/or block diagrams of methods, systems, and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 is a block diagrams illustrating selected elements of a system 100 for personalized intent prediction, in accordance with some embodiments. The illustrated components of FIG. 1, along with other various modules and components, may be coupled to each other by or through one or more control or data buses that enable communication between them. The use of control and data buses for the interconnection between and exchange of information among the various modules and components would be apparent to a person skilled in the art in view of the description provided herein.

In various embodiments, system 100 may be, or be a component of, a system for access control that uses personalized intent prediction to determine when and whether to pre-emptively enable access to a secure location or to a restricted computing system or other restricted equipment. For example, in some embodiments system 100 may be, or may be a component of, a system for access control that uses personalized intent prediction to determine when and whether to pre-emptively enable entry by a particular person to an access-controlled location as the person approaches an entrance to the access-controlled location. In other embodiments, system 100 may be communicatively coupled to an access control system and may provide a personalized intent score to the access control system, as described herein. In some embodiments, system 100 may be integrated with an electronic computing device or an electronic communications device, for example, desktop computer, a laptop computer, a tablet computer, a cellular telephone or other mobile communications device, and the like.

As illustrated in FIG. 1, system 100 includes one or more image capture devices 110, each of which is associated with a secure location or restricted equipment, and an intent prediction processing unit 120. In some embodiments, system 100 may include a respective image capture device 110 for each of multiple secure locations, or entry points thereof, for which intent predictions are made by system 100, or for each restricted piece of equipment for which intent predictions are made by system 100. In other embodiments, a single image capture device 110 may be associated with more than one secure location, more than one entry point for a secure location, or more than one restricted piece of equipment for which intent predictions are made by system 100.

In some embodiments, one or more of the image capture devices 110 may be or include high resolution devices with expensive optics. For example, a typical RGB camera used in an authentication system for secure access may include high resolution large pixel size imagers with expensive varifocal lens. In some embodiments, one or more of the image capture devices 110 may be or include a low cost RGB imager with an inexpensive lens, which may be sufficient for use in the personalized intent prediction systems described herein.

Each of the image capture devices 110 may include various digital and analog components, which for brevity are not described herein and which may be implemented in hardware, software, or a combination of both. Each image capture device 110 may include one or more wired or wireless input/output (I/O) interfaces configurable to communicate with intent prediction processing unit 120. For example, each of the one or more image capture devices 110 may capture image data depicting the behavior of a person on approach toward a secure location or restricted equipment and may provide the image data to intent prediction processing unit 120 over a wired or wireless I/O interface for analysis with respect to intent prediction.

In some embodiments, an image capture device 110 may be configured to pre-process captured image data to detect a person on approach toward the secure location or restricted equipment. For example, the image capture device 110 may include facial recognition technology for identifying the face of a person on approach as matching the face of a particular known person. As shown in FIG. 1, in some embodiments, system 100 may include an authentication system 150 communicably coupled to one or more image capture devices 110 and configured to determine whether a person on approach toward the secure location or restricted equipment is authorized to access the secure location or restricted equipment based on image data captured by and received from the image capture devices 110. In some embodiments, authentication system 150, rather than an image capture device 110, may include facial recognition technology for identifying the face of a detected person on approach. In some embodiments, the person on approach may be authenticated using a facial-recognition-based single factor authentication process or a facial-recognition-based multi-factor authentication process. In other embodiments, the person on approach may be authenticated using other means, such as by detecting and recognizing a mobile phone or other portable device carried by the person through a Bluetooth connection, by detecting a badge, fob, or other item worn or carried by the person that includes a radio-frequency identifier (RFID) tag using an RFID reader, or by biometrics means other than facial recognition. In some embodiments, authentication may be performed by intent prediction processing unit 120 or by an authentication system 150 that is external to, and communicably coupled to, system 100.

In some embodiments, an image capture device 110 may be or include a video camera configured to capture image data in the form of a video stream depicting the behavior of a person on approach toward a secure location or restricted equipment. In some embodiments, an image capture device 110 may be or include a camera configured to capture image data in the form of a sequence of still images that collectively depict the behavior of a person on approach toward a secure location or restricted equipment. Intent prediction processing unit 120 may receive the captured image data from the image capture device 110 and may analyze the image data received from the image capture device 110 to generate intent data to be used in predicting whether the person on approach toward the secure location or restricted equipment intends to access the secure location or restricted equipment. The intent data may include trajectory data, gaze data, pose data, or other behavioral data representing a behavior of the person on approach that is discernable in the image data. As described in more detail below, intent prediction processing unit 120 may also obtain non-trajectory-based information associated with the person on approach to be used in predicting whether the person on approach intends to access the secure location or restricted equipment.

Figure 4:
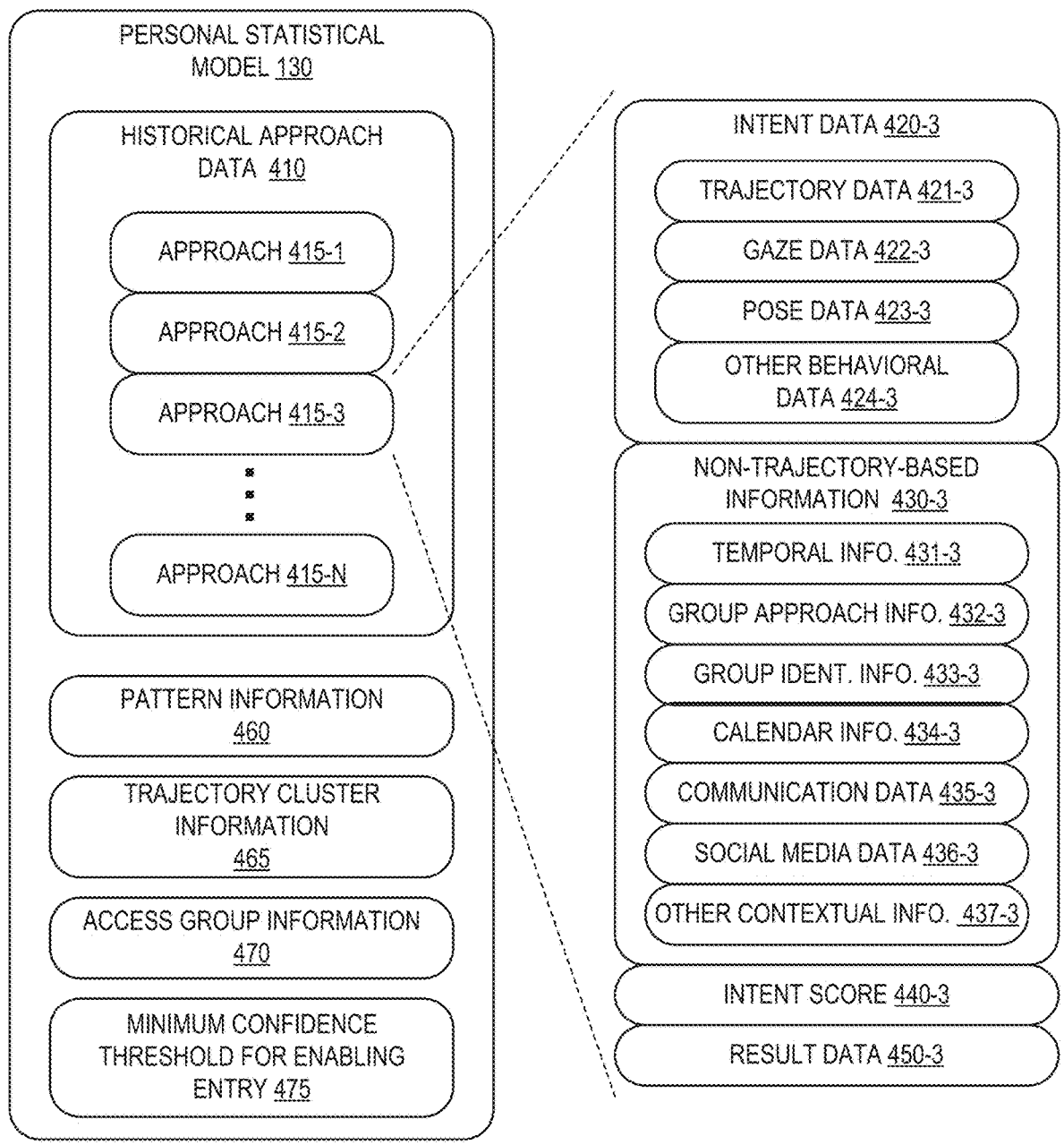
FIG. 4 illustrates selected elements of a personal statistical model for intent prediction, in accordance with some embodiments.

As illustrated in FIG. 1, system 100 may include one or more personal statistical models 130, each of which may include, for each of multiple historical approaches by a particular person toward a specific secure location or a specific restricted piece of equipment, intent data, non-trajectory-based information, a personalized intent score generated for the person on the historical approach, and result data indicating whether or not the person entered the specific secure area or accessed the specific restricted piece of equipment on the historical approach. Each of the personal statistical models may also include observed pattern information, trajectory cluster information, access group information, or a minimum confidence threshold for enabling access to the specific secure location or the specific restricted piece of equipment. One non-limiting example of a personal statistical model 130 for intent prediction is illustrated in FIG. 4 and described below.

In at least some embodiments, intent prediction processing unit 120 may compare the intent data generated based on the image data received while the person is on approach toward the secure location or restricted equipment and the obtained non-trajectory-based information to information maintained in a personal statistical model for the person and for historical approaches toward the secure location or restricted equipment. Based on the comparison, intent prediction processing unit 120 may output a personalized intent score 125 indicating the likelihood that the person on approach intends to enter the secure location or access the restricted equipment. In some embodiments, the personalized intent score may represent a calculated probability that the person on approach intends to enter the secure location or access the restricted equipment, which may be represented as percentage value or a value between zero and one, and the minimum confidence threshold for enabling access to the specific secure location or the specific restricted piece of equipment may be specified in terms of a particular minimum percentage value or a particular minimum value between one and zero. In some embodiments, the personalized intent score may represent a confidence that the person on approach intends to enter the secure location or access the restricted equipment, which may be represented as percentage value or a value between zero and one, and the minimum confidence threshold for enabling access to the specific secure location or the specific restricted piece of equipment may be specified in terms of a particular minimum percentage value or a particular minimum value between one and zero. In some embodiments, the minimum confidence threshold may be determined dependent on requirements of an applicable level of security for the secure location or restricted equipment. In some embodiments, the minimum confidence threshold may be re-calibrated if the personalized intent prediction process produces too many false positives in which access is unnecessarily enabled to meet requirements of the applicable security level. In the illustrated embodiment, the personalized intent score 125 may be provided to another element of an access control system (not shown in FIG. 1) where it may inform a decision about whether and when to pre-emptively enable access to the secure location or restricted equipment prior to the person reaching the secure location or restricted equipment, such as by unlocking or opening a door or disarming a security feature of the restricted equipment.

In some embodiments, system 100 may also include one or more generalized statistical models 140, each of which may include, based on multiple historical approaches by multiple persons toward a specific secure location or a specific restricted piece of equipment, aggregated intent data, aggregated non-trajectory-based information, aggregated intent scores associated with the multiple historical approaches, and aggregated result data indicating whether or not persons entered the specific secure area or accessed the specific restricted piece of equipment on various historical approaches. The generalized statistical models 140 may also include aggregated pattern information, aggregated trajectory cluster information, aggregated access group information, or a minimum confidence threshold for enabling access to the specific secure location or the specific restricted piece of equipment that is based on aggregated data. Trajectory clusters and other aggregated information are described in more detail below. In at least some embodiments, a personalized intent score generated based on a personal statistical model for a given person on a current approach toward a particular access-controlled location may be different than a generalized intent score determined for each of multiple persons other than the given person based on respective trajectories of the multiple other persons toward the access-controlled location on respective approaches that are similar to the trajectory of the given person toward the access-controlled location on the current approach.

Figure 6:
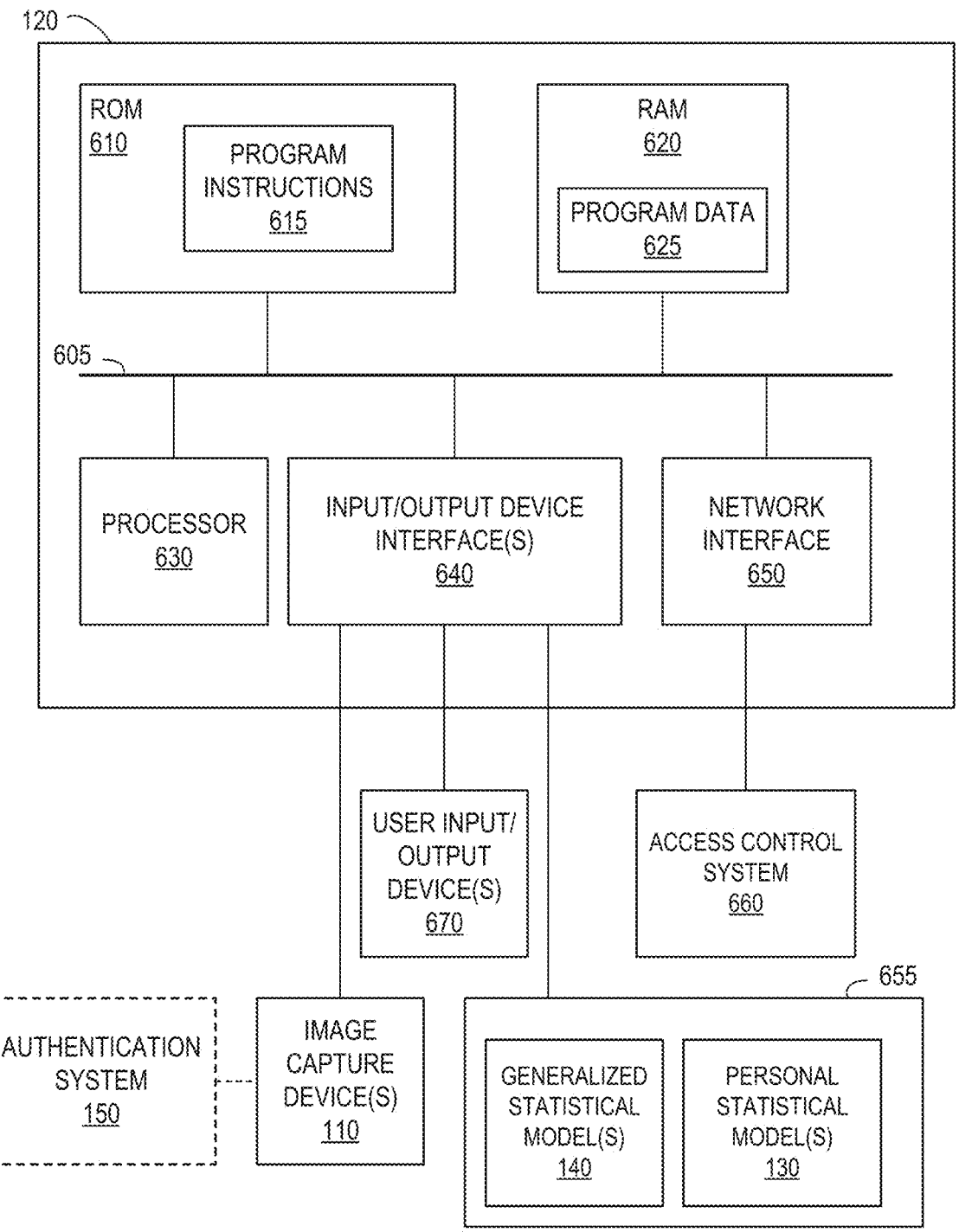
FIG. 6 is a block diagram illustrating selected elements of an intent prediction processing unit configured for personalized intent prediction and for training a neural network or machine learning model to perform such predictions, in accordance with some embodiments.

In at least some embodiments, intent prediction processing unit 120 may include a microprocessor configured to execute program instructions that implement a neural network or machine learning model trained for personalized intent prediction. More specifically, the neural network or machine learning model may be trained for generating a personalized intent score 125 indicating the likelihood that a given person intends to enter a secure location or access restricted equipment based, at least in part, on a personal statistical model for the given person. In some embodiments, the intent prediction processing unit 120 may include a graphics processing unit (GPU) or a vision processing unit or video processing unit, either of which may be referred to as a VPU, configured to perform certain aspects of a process for personalized intent prediction. In some embodiments, other program instructions, when executed by the microprocessor, may perform a process for training a neural network or machine learning model to perform such predictions. Selected elements of an example intent prediction processing unit 120 are illustrated in FIG. 6 and described in more detail below. In other embodiments, system 100 may include more, fewer, or different elements than those illustrated in FIG. 1.

Figure 2:
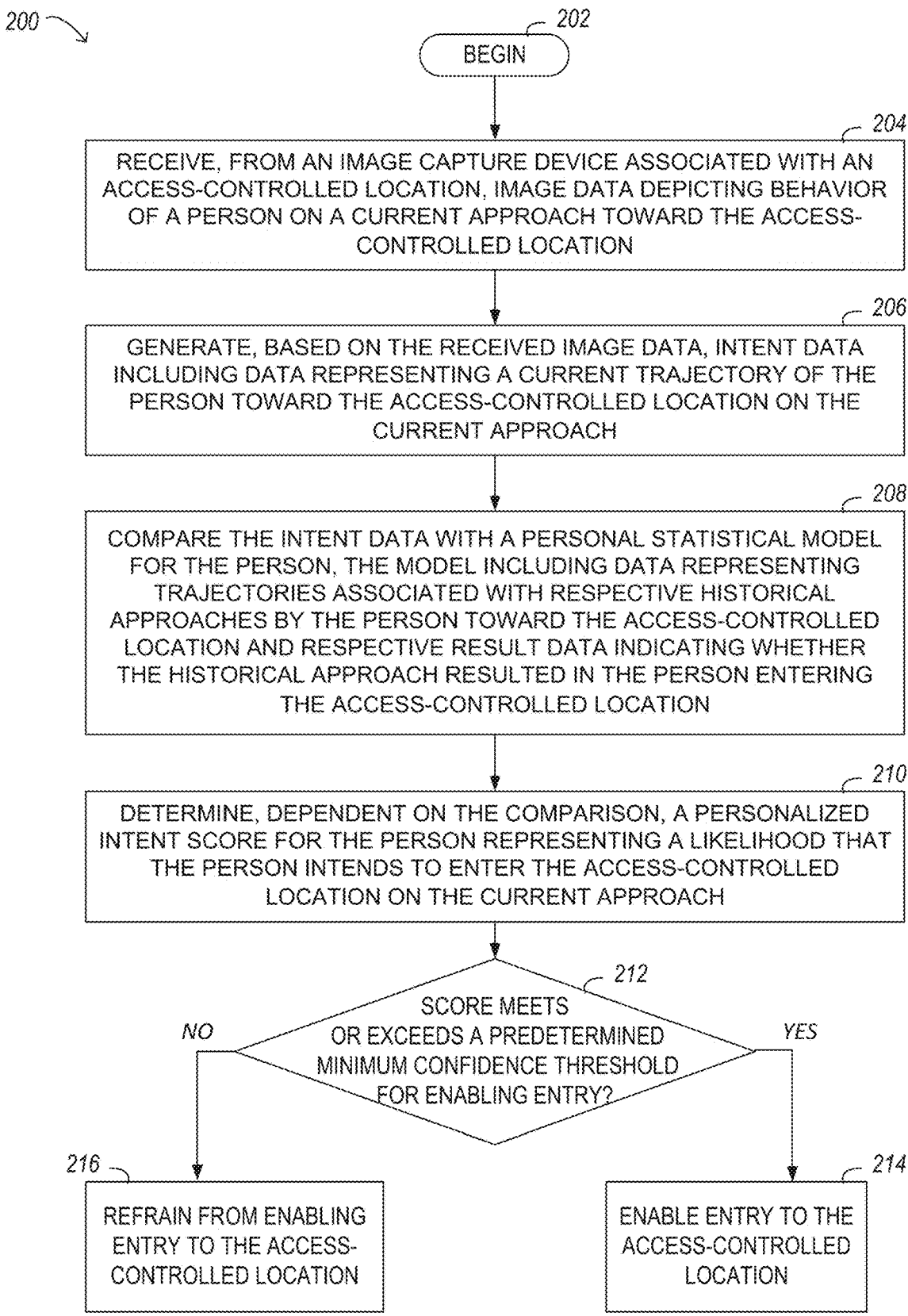
FIG. 2 is a flow diagram of selected elements of an example process for predicting intent to enter a controlled-access location, in accordance with some embodiments.

Referring now to FIG. 2, there is provided a flow diagram of selected elements of an example process 200 for predicting intent to enter a controlled-access location, in accordance with some embodiments. While a particular order of operations is indicated in FIG. 2 for illustrative purposes, the timing and ordering of such operations may vary where appropriate without negating the purpose and advantages of the examples set forth in detail throughout the remainder of this disclosure. In various embodiments, some or all of the operations of process 200 may be performed by an intent prediction processing unit, such as intent prediction processing unit 120 illustrated in FIG. 1 and FIG. 6.

In this example embodiment, process 200 begins with block 202 and continues with block 204, where image data depicting the behavior of a person on a current approach toward the access-controlled location is received from an image capture device associated with an access-controlled location. In various embodiments, the image data may include a video stream captured by the image capture device as the person moves toward the access-controlled location on the current approach or data representing a sequence of still images captured by the image capture device as the person moves toward the access-controlled location on the current approach.

At block 206, process 200 includes generating, based on the received image data, intent data including data representing a current trajectory of the person toward the access-controlled location on the current approach. In some embodiments, the image data may be received and processed by the intent prediction processing unit to generate the intent data. In other embodiments, the image data may be received and pre-processed by another element of an access control system to generate metadata usable for intent prediction and the intent prediction processing unit may receive and analyze the metadata to generate the intent data. For example, the metadata may include data representing persons or objects depicted in the image data along with location or movement information associated with those persons or objects. In one example, the intent data may include trajectory data in the form of a sequence of motion vectors each corresponding to a location along the path of the person as the person moves toward the access-controlled location, or toward the entry point thereof, and indicating a direction and speed at which the person is moving. In some embodiments, the intent data may also include data representing a gaze or pose of the person as they approach the access-controlled location or data representing one or more other behaviors discernable in the received image data. As described in more detail below, the process may also include, prior to generating the intent data, determining the identity of the person approaching the access-controlled location or determining whether the person approaching the access-controlled location is authorized to enter the access-controlled location (not shown in FIG. 2).

At block 208, the process includes comparing the intent data with a personal statistical model for the person, where the personal statistical model includes data representing trajectories associated with respective historical approaches by the person toward the access-controlled location and respective result data indicating whether the historical approach resulted in the person entering the access-controlled location. The information in the personal statistical model, which reflects how the person has behaved in the past when entering the access-controlled location and when not entering the access-controlled location, may be used to more accurately predict whether the person intends to enter the access-controlled location on the current approach than behavioral information for multiple persons that has been aggregated in a generalized statistical model. For example, intent prediction processing unit 120 may be configured to compare the data representing the current trajectory of the person toward the access-controlled location on the current approach with the data representing the trajectories associated with historical approaches by the person toward the access-controlled location and to determine the respective result data associated with historical approaches that are similar to the current approach.

At block 210, process 200 includes determining, dependent on the comparison, a personalized intent score for the person representing a likelihood that the person intends to enter the access-controlled location on the current approach. In at least some embodiments, intent predictions based on a personal statistical model for the person on approach may be significantly more accurate than intent predictions based on aggregated trajectory information alone.

If at block 212, the personalized intent score meets or exceeds a predetermined minimum confidence threshold for enabling entry to the access-controlled location, process 200 continues at block 214. Otherwise, the process proceeds to block 216.

At block 214, process 200 includes enabling entry to the access-controlled location. For example, if the personalized intent score meets or exceeds a predetermined minimum confidence threshold for enabling entry to the access-controlled location, the process may include pre-emptively unlocking or opening a door, gate, passageway, portal, threshold, or other opening or ingress point for the access-controlled location prior to the person reaching that point. In at least some embodiments, pre-emptively enabling access to the access-controlled location automatically and in real time when the person intends to enter the access-controlled may significantly improve the user experience for the person on approach. In some embodiments, the personalized intent score 125 may be provided to another element of an access control system where it informs a decision about whether and when to grant access to the access-controlled location.

At block 216, in response to determining that the personalized intent score does not meet or exceed the predetermined minimum confidence threshold for enabling entry to the access-controlled location, the process includes refraining from enabling entry to the access-controlled location. For example, rather than pre-emptively unlocking or opening a door, gate, passageway, portal, threshold, or other opening or ingress point for the access-controlled location prior to the person reaching that point, access might not be granted until and unless a more definitive indication of intent is detected. In some embodiments, such an indication may include the person turning and directly facing a door, grabbing a door handle, or touching a door or a physical or virtual button associated with the door, some of which may be detected by touch sensors or in image data captured by the image capture device associated with the access-controlled area. In some embodiments, such an indication may include the detection by a motion detector or a biometric sensor of the person crossing an access threshold, a determination that the person has entered a password or other access code on a device associated with a door, a determination using voice recognition that a password or other access code was spoken by the person, or a determination that a mobile phone or other portable device carried by the person and including Bluetooth technology, or a badge, fob, or other item worn or carried by the person that includes an RFID tag, is in close proximity to an entry point or access threshold of the access-controlled location, such as within a few inches, indicating that entry is imminent. In at least some embodiments, refraining from pre-emptively unlocking or opening a door, gate, passageway, portal, threshold, or other opening or ingress point for the access-controlled location prior to the person reaching that point when the person does not actually intend to enter the access-controlled location may improve security and reduce unnecessary wear on mechanical parts of an access-control system associated with the access-controlled location caused by frequent use.

In at least some embodiments, some or all of the operations of process 200 illustrated in FIG. 2 may be repeated one or more times to perform personalized intent prediction when the person, or another person, subsequently approaches the access-controlled location. For example, in some embodiments, the operations may be performed automatically each time facial recognition technology identifies a known person approaching the access-controlled location or each time an image capture device of a personalized intent prediction system captures image data depicting the behavior of a person on approach toward the access-controlled location.

In at least some embodiments, knowing the identity of a person on approach toward a secure location or restricted equipment allows an intent prediction to be personalized in a variety of ways using various types of information associated with the identified person and with their past behavior. For example, while many people might be authorized to enter a particular access-controlled location, such as a lab, particular ones of those people may be statistically more or less likely to actual enter the lab than others based on their past behavior. Therefore, an intent prediction for a given person on approach toward the lab, and a corresponding calculation of an intent score, may be personalized based on that person's past behavior and not just on whether they are authorized to enter.

In some embodiments, temporal information associated with a person on approach may be used to personalize an intent prediction. For example, the person may typically enter an access-controlled location, such as their office, within a narrow window of time each morning. In another example, the person may typically spend several hours in an access-controlled location, such as a lab or classroom, between certain hours on particular days of the week. In yet another example, the person may typically leave an access-controlled location, such as for lunch or a coffee break, on a fairly consistent schedule or may typically return from such breaks within a fairly consistent window of time after leaving. By contrast, the person may typically refrain from entering an access-controlled location on a given approach if they exited the access-controlled location after the close of business, such as after 5:00 pm. In each of these examples, the past behavior of the person may be reflected in the personal statistical model for the person in the form of access logs that are stored as result data in association with corresponding approach information and may inform an intent prediction, and a corresponding calculation of an intent score, associated with a current approach when data in the personal statistical model is compared with the date, day of the week, or time of day of the current approach.

In some embodiments, pattern information associated with a person on approach may be used to personalize an intent prediction. The pattern information may include data indicating patterns of behavior that are typical for the person when they access a particular secure area or restricted equipment and when they do not access a particular secure area or restricted equipment. For example, a manager may typically only enter an access-controlled location, such as a lab or manufacturing area, when accompanied by one or more other persons or when accompanied by a particular other known person, even though the manager is authorized to enter. In another example, a person who enters a first access-controlled location, such as a secure building or a restricted hallway, may typically enter a second access-controlled location, such as an office or lab within the secure building or restricted hallway, shortly thereafter. In yet another example, a person may rarely re-enter an access-controlled location, such as a clean room, after leaving the access-controlled location earlier on the same day. In each of these examples, the observed patterns of behavior may be reflected in the personal statistical model for the person in the form of access logs that are stored as pattern information in association with corresponding approach information or in the form of sequences of observed behaviors that are generated based on access logs and corresponding approach information and may inform an intent prediction, and a corresponding calculation of an intent score, associated with a current approach when data in the personal statistical model is compared with circumstances associated with the current approach.

In some embodiments, user group information associated with a person on approach may be used to personalize an intent prediction. For example, within a pool of persons who are authorized to enter a lab, there may be smaller groups of users, such as lab technicians or persons assigned to a particular project team, whose members are much more likely than members of other user groups within the pool at large to actually enter the lab. In some cases, the members of a particular user group may have increased or reduced access rights compared to other members of the pool at large, such as restrictions, or a lack thereof, on the times at which the members of the user group can enter the access-controlled location, the number of times that the members can enter the access-controlled location in a single day, the number of members that can be in the access-controlled location at the same time, or access to a second access-controlled area with the access-controlled location.

In some embodiments, when the members of a particular user group are much more likely than other authorized persons to enter an access-controlled location, and to do so frequently or on a regular basis, the personalized intent score generated when such members are on approach toward the access-controlled location may be higher than a personalized intent score generated for non-members, even if the members and non-members have similar access rights, thus increasing the likelihood that access to the access-controlled location will be pre-emptively enabled prior to the members reaching an entry point of the access-controlled location. In some embodiments, when the members of a particular user group are much more likely than other authorized persons who are non-members to enter an access-controlled location, the personalized intent score generated when a non-member is on approach toward the access-controlled location may be lower than a personalized intent score generated for members, even if the members and non-members have similar access rights, thus decreasing the likelihood that access to the access-controlled location will be pre-emptively enabled prior to the non-member reaching an entry point of the access-controlled location. In some embodiments, rather than increasing the personalized intent score for members of a particular user group that are much more likely than other authorized persons to enter an access-controlled location, a minimum confidence threshold for enabling entry may be reduced when the members approach the access-controlled location than when non-members are on approach, thus increasing the likelihood that access to the access-controlled location will be pre-emptively enabled prior to the members reaching an entry point of the access-controlled location even if other information, such as temporal or contextual information, does not necessarily indicate a high likelihood that the person intends to enter the access-controlled location.

In some embodiments, contextual information associated with a person on approach may be used to personalize an intent prediction. For example, calendar information may indicate that the person is likely to be present in the access-controlled location at a given time, an email-based communication, text-based communication, or voice-based communication may indicate that the person is likely to be present in the access-controlled location at a given time, or a social media post may indicate that the person is likely to be present in the access-controlled location at a given time. In some embodiments, these and other types of contextual information may provide clues that the person intends to enter the access-controlled location at a certain time or within a certain window of time. Conversely, contextual information may provide clues that the person does not intend to enter the access-controlled location at a certain time or within a certain window of time. For example, calendar information, an email-based communication, a text-based communication, a voice-based communication, or a social media post may indicate that the person is likely to be walking toward a destination other than the access-controlled location on the current approach to participate in a meeting or other activity. When contextual information indicates a likelihood that the person intends to enter the access-controlled location at a certain time or within a certain window of time, the intent score generated for an approach by the person at that time or within that window of time may be higher than might otherwise be indicated based on other information, such as gaze or pose data, pattern information, or user group information.

Figure 3:
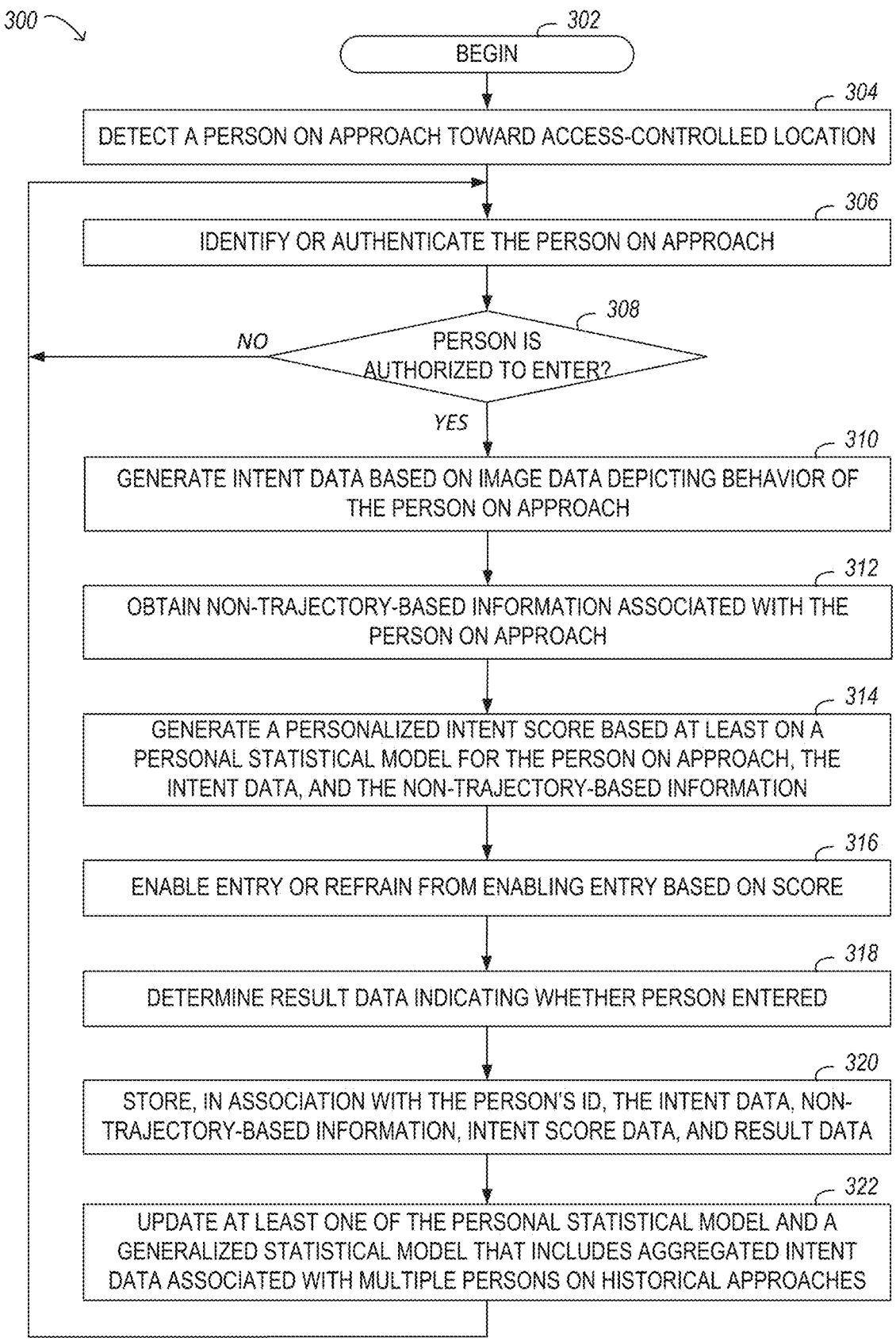
FIG. 3 is a flow diagram of selected elements of an example process for using and updating a personal statistical model for intent prediction, in accordance with some embodiments.

Referring now to FIG. 3, there is provided a flow diagram of selected elements of an example process 300 for using and updating a personal statistical model for intent prediction, in accordance with some embodiments. While a particular order of operations is indicated in FIG. 3 for illustrative purposes, the timing and ordering of such operations may vary where appropriate without negating the purpose and advantages of the examples set forth in detail throughout the remainder of this disclosure. In some embodiments, various operations of process 300 may be performed by one or more image capture devices, such as the image capture devices 110 illustrated in FIG. 1 and FIG. 6, or by an intent prediction processing unit, such as intent prediction processing unit 120 illustrated in FIG. 1 and FIG. 6.

In illustrated embodiment, process 300 begins with block 302 and continues with block 304, where a person on approach toward an access-controlled location is detected. For example, the person may be detected in image data captured by an image capture device associated with the access-controlled location and positioned such that it has a field of view that includes an area near an entry point of the access-controlled location, such as a door, gate, passageway, portal, threshold, or other opening or ingress point for the access-controlled location, and at least a portion of an area through which the person passes on a current approach toward the entry point of the access-controlled location. In some embodiments, the person may be detected by the image capture device using motion detection, object recognition, or other processes. In some embodiments, the image capture device may be a video camera that captures a video stream as the person moves toward the access-controlled location, or toward the entry point thereof, on the current approach. In some embodiments, the image capture device may capture a sequence of still images as the person moves toward the access-controlled location, or toward the entry point thereof, on the current approach.

At block 306, the process includes identifying or authenticating the person on approach. For example, in some embodiments, the image capture device may be configured to apply facial recognition to the captured image data and to identify the person on approach by matching image data representing the face of the person on approach with image data representing the face of one of multiple known persons. In some embodiments, the person on approach may be authenticated using a facial-recognition-based single factor authentication process or a facial-recognition-based multi-factor authentication process. In other embodiments, the person on approach may be authenticated using other means, such as by detecting and recognizing a mobile phone or other portable device carried by the person through a Bluetooth connection, by detecting a badge, fob, or other item worn or carried by the person that includes an RFID tag using an RFID reader, or by biometrics means other than facial recognition.

If, at block 308, the person on approach is authorized to enter the access-controlled location, process 300 continues at block 310. Otherwise, the process returns to block 306.

At block 310, process 300 includes generating intent data based on image data depicting behavior of the person on approach. The generated intent data may then be associated with the identity of the person and with the current approach by the person toward the access-controlled location. For example, an intent prediction processing unit may receive image data from the image capture device and may analyze the image data to generate the intent data. In at least some embodiments, the intent data may include data representing a current trajectory of the person toward the access-controlled location, or toward the entry point thereof, on the current approach.

In one example embodiment, the intent prediction processing unit may generate, based on the image data, trajectory data including a sequence of motion vectors each corresponding to a location along the path of the person as the person moves toward the access-controlled location, or toward the entry point thereof, and indicating a direction and speed at which the person is moving. In other embodiments, the trajectory data may include data in other formats that reflect the location or position of the person at different points in time or the path on which the person moves toward the access-controlled location. For example, the trajectory data may include a sequence of time-stamped data points each represent a respective location of the person while on the current approach. In some embodiments, the intent prediction processing unit may receive a sequence of time-stamped data points, such as from the image capture device, and may apply a curve fitting operation to generate trajectory data representing a smooth path taken by the person on approach. In other embodiments, image data may be received and pre-processed by another element of an access control system to generate trajectory data in the form of motion vectors, time-stamped location data, or another data representation, that is then provided to the intent prediction processing unit for subsequent use in determining an intent score. In some embodiments, the intent prediction processing unit may begin generating trajectory data as soon as the person is detected within the field of view of the image capture device. In other embodiments, the intent prediction processing unit may begin generating trajectory data in response to the identification or authentication of the person on approach. The number of locations represented in the trajectory data, or the granularity in the distances between adjacent locations represented in the trajectory data, may be programmable based on the size of the area in the field of view of the image capture device, the number and location of alternate destinations for the person in the field of view of the image capture device, the amount of memory available for storing trajectory data for one or more persons on various approaches toward the access-controlled location, or other factors. In some embodiments, the number of locations represented in the trajectory data, or the granularity in the distances between adjacent locations represented in the trajectory data, may be dynamically re-configurable in response to the rate at which image data is captured in terms of frames per second, the speed at which the person is moving, a change in the speed at which the person is moving, the person stopping during the current approach, the person passing the entry point of the access-controlled location, or the person changing direction such that they move toward a destination other than the access-controlled location or the entry point thereof. In some embodiments, the intent prediction processing unit may continue to generate trajectory data for the person as long as the person is visible in the image data received from the image capture device regardless of whether or not the person enters the access-controlled location.

In some embodiments, the intent data generated by the intent prediction processing unit may include data representing a gaze of the person as they approach the access-controlled location, or the entry thereof. For example, the intent data may include gaze data indicating whether the person has looked at the entry point of the access-controlled location while on the current approach, or whether the person has looked toward an alternate destination. In some embodiments, the intent data generated by the intent prediction processing unit may include data representing a pose of the person as they approach the access-controlled location, or the entry thereof. For example, the intent data may include pose data indicating that the person's body is or was turned toward the entry point of the access-controlled location while on the current approach, that the person pointed or otherwise gestured toward the entry point of the access-controlled location, or that the person performed a recognizable gesture while on the current approach. In general, the intent data may include data representing any of various types of behaviors by the person as they approach the access-controlled location, or the entry thereof, that is discernable in the image data received from the image capture device associated with the access-controlled location.

At block 312, the process includes obtaining non-trajectory-based information associated with the person on approach. For example, in some embodiments, the non-trajectory-based information may include one or more of access group information indicating a group of users having common access rights with respect to the access-controlled location that includes the person on approach, current temporal information indicating a date, a day of the week, or a time of day associated with the current approach, current group approach information indicating whether any other person or persons accompany the person on the current approach, and current group identification information indicating a respective identity for each of one or more other persons accompanying the person on the current approach. In some embodiments, the non-trajectory-based information may include contextual information associated with the current approach by the person, including one or more of calendar information indicating that the person is likely to be present in the access-controlled location at a given time, an email-based communication, text-based communication, or voice-based communication indicating that the person is likely to be present in the access-controlled location at a given time, and a social media post indicating that the person is likely to be present in the access-controlled location at a given time. In one example, calendar information may indicate that the person, or one or more other persons who are accompanying the person on the current approach, were invited to or accepted an invitation to a meeting to be held in the access-controlled location at the given time. In another example, a text message sent by the person may indicate that the person is on their way to a meeting or other activity taking place in the access-controlled location. In yet another example, the person may speak to another person using a land mobile radio device, a mobile phone, or an intercom system from which audio data is captured by an employer system, and the captured audio data may be interpreted using natural language processing (NLP). The audio data may contain language indicating that the person intends to attend a meeting or take place in another type of activity in the access-controlled location during a particular window of time. In various embodiments, any or all of these types of contextual information may be subsequently be used in generating the personalized intent score.

At block 314, process 300 includes generating a personalized intent score based at least on a personal statistical model for the person on approach, the intent data, and the non-trajectory-based information. The personal statistical model for the person on approach may include, for each of multiple historical approaches by the person toward the access-controlled location, intent data, non-trajectory-based information, a personalized intent score generated for the person on the historical approach, and result data indicating whether or not the person entered the access-controlled area on the historical approach. The personal statistical model may also include one or more of pattern information, trajectory cluster information, access group information, and a minimum confidence threshold for enabling entry to the access-controlled location. As described herein, the information in the personal statistical model, which reflects learned behaviors of the person on approach when they enter the access-controlled location and when they do not enter the access-controlled location, may be used to more accurately predict whether the person intends to enter the access-controlled location on the current approach than behavioral information for multiple persons that has been aggregated in a generalized statistical model. One non-limiting example of a personal statistical model for intent prediction is illustrated in FIG. 4 and described below.

At block 316, the process includes enabling entry to the access-controlled location or refraining from enabling entry based on the personalized intent score. For example, if the personalized intent score meets or exceeds a predetermined minimum confidence threshold for enabling entry to the access-controlled location, the process may include pre-emptively unlocking or opening a door, gate, passageway, portal, threshold, or other opening or ingress point for the access-controlled location prior to the person reaching that point. Conversely, in response to determining that the personalized intent score does not meet or exceed the predetermined minimum confidence threshold for enabling entry to the access-controlled location, the process includes refraining from enabling entry to the access-controlled location. For example, rather than pre-emptively unlocking or opening a door, gate, passageway, portal, threshold, or other opening or ingress point for the access-controlled location prior to the person reaching that point, access might not be granted until and unless a more definitive indication of intent, such as any of those described herein, is detected.

At block 318, process 300 includes determining result data indicating whether or not the person entered the access-controlled location on the current approach. In some embodiments, result data for the current approach may be determined based on image captured by and received from the image capture device. In other embodiments, result data for the current approach may be determined based on access logs associated with the access-controlled location instead of, or in conjunction with, image data. For example, access logs associated with the access-controlled location may indicate, for each approach by the person, whether or not a door, gate, passageway, or other opening for the access-controlled location was opened or whether or not the person passed through a portal, crossed a threshold, or entered the access-controlled location at any ingress point for the access-controlled location.

At block 320, the process includes storing, in association with an identifier of the person, the generated intent data, the obtained non-trajectory-based information, the generated intent score, and the result data. For example, any or all of this information may be stored as metadata usable in updating and improving the personalized intent prediction process.

At block 322, process 300 includes updating at least one of the personal statistical model and a generalized statistical model that includes aggregated intent data associated with multiple persons on historical approaches, based on the stored information that is associated with the current approach. For example, updating the personal statistical model may include adding an entry for the current approach to the historical approach data in the personal statistical model, updating the respective weightings applied to various elements of the intent data or non-trajectory-based information when generating a personalized intent score, updating pattern information, trajectory cluster information, or access group information associated with approaches by the person toward the access-controlled location, or updating the minimum confidence threshold for enabling entry to the particular access-controlled location.

In some embodiments, if the personalized intent prediction process produces too many false positives, in which entry to a particular access-controlled location is unnecessarily enabled, to meet requirements of an applicable security level, the minimum confidence threshold for pre-emptively enabling entry into the access-controlled location may need to be increased. For example, for an access-controlled location in which confidential records are kept, if a minimum confidence threshold of 85% results in a rate of 10% false positives, there may be no need to update the minimum confidence threshold. However, for an access-controlled location in which top secret activities take place, if a minimum confidence threshold of 95% results in a rate of 5% false positives, the minimum confidence threshold may need to be increased to reduce the potential for security breaches. On the other hand, if the minimum confidence threshold for pre-emptively enabling entry into a particular access-controlled location is set too high, it may result in a high rate of false negatives, in which authorized persons who intend to enter the access-controlled location must provide a definitive indication of intent before gaining entry into the access-controlled location, potentially causing frustration. In some embodiments, an administrator may determine an appropriate minimum confidence threshold for pre-emptively enabling entry into a particular access-controlled location, and any updates thereto, based on a tradeoff between the rate of false positives, which may result in security breaches, and the rate of false negatives, which may cause frustration, and any applicable security level requirements for the access-controlled location.

In another example, updating the generalized statistical model may include updating aggregated approach information, aggregated intent data, aggregated non-trajectory-based information, aggregated intent scores associated with historical approaches toward the access-controlled location, aggregated result data indicating whether or not persons entered the access-controlled location on various historical approaches, aggregated pattern information, aggregated trajectory cluster information, aggregated access group information, or a minimum confidence threshold for enabling access to the access-controlled location that is based on aggregated data across various historical approaches by multiple persons.

In some embodiments, the intent prediction processing unit may determine an update action with which to update the personal statistical model for the person based on a determination of whether the intent data associated with the current approach, the non-trajectory-based information associated with the person and the current approach, and result data indicating whether or not the person entered the access-controlled location on the current approach are similar to data representing multiple similar trajectories that are associated with respective historical approaches by the person, non-trajectory-based information associated with the person and with trajectories in a given one of one or more clusters of trajectories associated with historical approaches by the person in the personal statistical model, and result data associated with multiple similar trajectories in the given cluster. The determined update action may include, for example, aggregating the intent data associated with the current approach into the data representing multiple similar trajectories in the given cluster in the personal statistical model or into data representing similar trajectories in a cluster in the generalized statistical model, or creating a new cluster including the intent data associated with the current approach and including the non-trajectory-based information associated with the person and the current approach in the personal statistical model or in the generalized statistical model.

As illustrated in FIG. 3, in at least some embodiments, some or all of the operations of process 300 illustrated in FIG. 3 may be repeated one or more times to perform personalized intent prediction when the person, or another person, subsequently approaches the access-controlled location. For example, in some embodiments, the operations may be performed automatically each time facial recognition technology identifies a known person approaching the access-controlled location or each time an image capture device of a personalized intent prediction system captures image data depicting the behavior of a person on approach toward the access-controlled location. In some embodiments and in certain scenarios, if another person approaches the access-controlled location, the intent prediction may be based on a respective personal statistical model for the other person. In some embodiments and in other scenarios, if another person approaches the access-controlled location, the intent prediction may be based on a generalized statistical model.

As described above in reference to FIG. 1 and FIG. 2, the personalized intent score 125 may be provided to another element of an access control system where it may inform a decision about whether and when to grant access to a secure location, and whether to do so pre-emptively. In other embodiments, a personalized intent score 125 may be provided to another element of an access control system where it may inform a decision about whether and when to grant access to a restricted computing system or other restricted equipment and whether to do so pre-emptively.

In at least some embodiments, the techniques described herein for personalized intent prediction may be applied in systems that implement intent prediction using unsupervised machine learning. In other embodiments, these techniques may be applied in intent prediction systems that employ supervised machine learning or other artificial intelligence techniques. For example, unsupervised personalized intent prediction techniques may operate under an assumption that in the majority of instances, a particular person who is authorized to enter an access-controlled location and who is determined to be on approach toward the access-controlled location, or an entry point thereof, intends to enter the access-controlled location and may predict that the person does not intend to enter the access-controlled location in those instances in which the person's behavior appears to be an outlier compared to their behavior in the majority of instances. Supervised personalized intent prediction techniques typically involve training a classifier, which may involve labeling behavior observed in historical approaches by a particular person toward an access-controlled location into which they are authorized to enter and reflected in a training data set as representing a behavior associated with an approach that resulted in the person entering the access-controlled location or as representing a behavior associated with an approach that resulted in the person failing to enter the access-controlled location. Machine learning techniques that may be used in the personalized intent prediction systems described herein may include, but are not limited to, Linear Regression techniques, Logistic Regression techniques, Decision Trees, SVM, Naive Bayes techniques, k-nearest neighbor techniques, K-Means clustering, Random Decision Forest techniques, Dimensionality Reduction Algorithms, various Gradient Boosting algorithms, such as Gradient Boosting Machine techniques, Extreme Gradient Boosting algorithms, Light Gradient Boosting Machine algorithms, or Gradient Boosting algorithms with categorical features, Apriori algorithms, Markov Decision Processes, and various neural networks, such Feedforward Neural Networks, Artificial Neuron Models, Radial Basis Function Neural Networks, Multilayer Perceptron networks, Convolutional Neural Networks, Deep Convolutional Neural Networks, Deconvolutional Neural Networks, Deep Convolutional Inverse Graphics Networks, Generative Adversarial Networks, Recurrent Neural Networks, Long/Short Term Memory techniques, Modular Neural Networks, Sequence-To-Sequence Models, Liquid State Machines, Extreme Learning Machines, Deep Residual Networks, Kohonen Networks, Support Vector Machines, or Neural Turing Machines.

In some embodiments, training a neural network or machine learning model to implement personalized intent prediction may include, for each of multiple approaches toward an access-controlled location, or an entry point thereof, by a particular person who has been identified and determined to be authorized to enter the access-controlled location, receiving image data depicting the person on approach and adding the image data to an element of a training data set for the neural network or machine learning model in association with an identifier of the person and of the access-controlled location.

Training the neural network or machine learning model to implement personalized intent prediction may also include, for each of the multiple approaches, generating intent data based on the image data and adding the intent data to the training data set element in association with the image data and the identifiers of the person and of the access-controlled location, obtaining non-trajectory-based information associated with the person on approach and adding the non-trajectory-based information to the training data set element in association with the image data, the identifiers of the person and of the access-controlled location, and the intent data, and generating a personalized intent score indicating a likelihood that the person intends to enter the access-controlled location on the current approach and adding the intent score to the training data set element in association with the image data, the identifiers of the person and of the access-controlled location, the intent data, and the non-trajectory-based information.

Training the neural network or machine learning model to implement personalized intent prediction may further include, for each of the multiple approaches, determining result data indicating whether or not the person entered the access-controlled location on the current approach and adding the result data to the training data set element in association with the image data, the identifiers of the person and of the access-controlled location, the intent data, the non-trajectory-based information, and the intent score, determining, dependent on a predetermined minimum confidence threshold for enabling entry to the access-controlled location and the result data, whether the intent score correctly predicted the person's intent with respect to entering the access-controlled location, and updating the neural network or machine learning model accordingly.

In some embodiments, updating the neural network or machine learning model may include updating, based on the training, respective weightings applied to various elements of the intent data or non-trajectory-based information when generating a personalized intent score. In some embodiments, updating the neural network or machine learning model may include updating, based on the training, pattern information, trajectory cluster information, or access group information associated with approaches by the person toward the access-controlled location. In some embodiments, updating the neural network or machine learning model may include updating the minimum confidence threshold for enabling entry to the particular access-controlled location based on the training. In general, updating the neural network or machine learning model may include updating, based on the training, any of the elements of a personal statistical model for the person, any of the elements of a generalized statistical model applicable to the current approach by the person, or any methods for calculating a personalized intent score for the current approach by the person using information maintained in the personal statistical model or in the generalized statistical model.

The operations of the training process described above may be repeated one or more times to train, retrain, or improve the intent prediction performance of the neural network or machine learning model as additional training data becomes available or in response to determining that the intent prediction performance does not yet meet a desired performance target. In some embodiments, following a training period, the resulting neural network or machine learning model, including a personal statistical model reflective of the training data set, may be used to perform personalized intent prediction when and if the person subsequently approaches the access-controlled location.

In some embodiments, updating the neural network or machine learning model based on the might not be performed in real time. For example, the updating may be performed during an audit of the personalized intent prediction performance or in response to receiving feedback indicating that particular predictions of intent have been confirmed as correct or determined to be incorrect.

FIG. 4 illustrates selected elements of a personal statistical model 130 for intent prediction, in accordance with some embodiments. In some embodiments, personal statistical model 130 may be specific to both a given person and a particular controlled-access location. In some embodiments, the system may maintain a respective personal statistical model 130 for each person/location pair. In still other embodiments, a single personal statistical model 130 may include data associated with a given person with respect to multiple access-controlled locations or may include data associated with multiple persons with respect to a particular access-controlled location. In at least some embodiments, the information stored in personal statistical model 130 may be based on data associated with historical approaches by a given person toward a particular access-controlled location over a long period of time, such as over many weeks or months.

In the illustrated embodiment, personal statistical model 130 includes, for a given person and with respect to a particular access-controlled location, historical approach data 410, pattern information 460, trajectory cluster information 465, access group information 470, and a minimum confidence threshold for enabling entry 475. In some embodiments, pattern information 460 may include data indicating observed patterns of behavior that are typical for the given person when they enter the access-controlled location and when they do not enter the access-controlled location. This may include information indicating that similar result patterns were detected for approaches that are associated with particular similar elements, or with particular combinations of similar elements, within intent data 420 or within non-trajectory-based information 430. In some embodiments, predicting whether the given person intends to enter the access-controlled area on a current approach may include comparing intent data and non-trajectory-based information for the current approach to corresponding information for one or more detected patterns reflected in the personal statistical model and, if the intent data and non-trajectory-based information is similar to that found in a given one of the detected patterns, biasing the calculation of the intent score toward the common result associated with the given detected pattern. In various embodiments, pattern information 460 may also indicate the number, frequency, or rate of occurrence of approaches associated with a detected pattern of behavior and any biasing of the calculation of the intent score may be dependent on the number, frequency, or rate of occurrence of approaches associated with a detected pattern of behavior.

In some embodiments, trajectory cluster information 465 may include data indicating which, if any, historical approaches include similar trajectories and results. In some embodiments, predicting whether the given person intends to enter the access-controlled area on a current approach may include comparing trajectory information for the current approach to trajectory information for one or more clusters of trajectories reflected in the personal statistical model and, if the current trajectory is similar to those found in a given one of the clusters of trajectories, biasing the calculation of the intent score toward the common result associated with the given trajectory cluster. In various embodiments, trajectory cluster information 465 may also indicate the number, frequency, or rate of occurrence of approaches having a given similar trajectory and a given similar result and any biasing of the calculation of the intent score may be dependent on the number, frequency, or rate of occurrence.

In some embodiments, access group information 470 may include data indicating a group of users having common access rights with respect to the access-controlled location that includes the given person. In some embodiments, the members of a particular user group, which may be a subset of users having common access rights with respect to the access-controlled location, may be much more likely than other authorized persons to enter an access-controlled location, and to do so frequently or on a regular basis. As described above, in some embodiments, the calculation of the intent score may be dependent on which, if any, such groups of users include the given person.

In some embodiments, the minimum confidence threshold for enabling entry 475 may represent a minimum intent score at which confidence that the given person intends to enter the access-controlled location is sufficient to warrant pre-emptively enabling access to the access-controlled location for the given user on an approach toward the access-controlled location prior to the given person reaching the access-controlled location or an entry point thereof.

The historical approach data 410 includes multiple approach entries 415, each associated with a respective one of multiple historical approaches by the given person toward the particular access-controlled location. Each approach entry 415 includes intent data 420, non-trajectory-based information 430, a personalized intent score 440, and result data 450. In some embodiments, an approach entry 415 may include some or all of the image data received from the image capture device that is associated with the respective historical approach.

As shown in FIG. 4, intent data 420-3 of approach entry 415-3 may include any or all of trajectory data 421-3, gaze data 422-3 indicating, for example, whether the given person has looked at the entry point of the access-controlled location while on the corresponding approach or whether the given person has looked toward an alternate destination, pose data 423-3 indicating, for example, that the given person's body is or was turned toward the entry point of the access-controlled location while on the approach, that the given person pointed or otherwise gestured toward the entry point of the access-controlled location, or that the given person performed a recognizable gesture while on the approach, and information reflecting other behaviors of the given person while on approach that are discernable in image data captured by an image capture device associated with the access-controlled location, shown as other behavioral data 424-3.

In some embodiments, trajectory data 421-3 may include a sequence of motion vectors each corresponding to a location along the path of the given person as the given person moves toward the access-controlled location, or toward the entry point thereof, and indicating a direction and speed at which the given person is moving. This trajectory information may initially indicate how the given person moved while on approach toward the access-controlled location and, subsequently, may also indicate when and whether the given person turned toward an entry point for the access-controlled location or turned away from the entry point toward another destination. In at least some embodiments, intent prediction processing unit 120 may generate and store trajectory data 421 for each approach by the given person toward the access-controlled location in the statistical model for the given person and for the access-controlled location.

As shown in the illustrated example, non-trajectory-based information 430-3 of approach entry 415-3 may include any or all of temporal information 431-3, group approach information 432-3 indicating whether any other person or persons accompanied the given person on the approach, group identification information 433-3 indicating a respective identity for each of one or more other persons who accompanied the given person on the approach, calendar information 434-3 for the given person, communication data 435-3, which may include data representing one or more email-based communications, text-based communications, or voice-based communications associated with the given person or with the approach, social media data 436-3 associated with the given person or with the approach, and any additional contextual information that may have provided insight into the likelihood that the given person intended to enter the access-controlled location on the approach, shown as other contextual information 437-3.

Intent score 440-3 of approach entry 415-3 represents the personalized intent score generated, by intent prediction processing unit 120, for the approach by the given person toward the particular access-controlled location, and result data 450-3 of approach entry 415-3 indicates whether or not the given person entered the particular access-controlled location on the approach corresponding to approach entry 415-3. In some embodiments, each of the other approach entries 415 may include elements similar to those of approach entry 415-3 shown in FIG. 4. In other embodiments, one or more approach entries 415 may include more, fewer, or different elements indicating information associated with a respective approach by the given person toward the particular access-controlled location.

In some embodiments, personal statistical model 130 may also include historical approach data 410, pattern information 460, trajectory cluster information 465, access group information 470, and a minimum confidence threshold for enabling entry 475 for a second person other than the given person with respect to the access-controlled location, which may be stored in separate instances of elements of the same types as the elements shown within personal statistical model 130 in FIG. 4. In other embodiments, personal statistical model 130 may include historical approach data 410, pattern information 460, trajectory cluster information 465, access group information 470, and a minimum confidence threshold for enabling entry 475 for the given person with respect to a second access-controlled location, which may be stored in separate instances of elements of the same types as the elements shown within personal statistical model 130 in FIG. 4. In still other embodiments, a separate instance of personal statistical model 130 may be created and maintained for each access-controlled location and for each person who is authorized to enter that access-controlled location, such that each instance of personal statistical model 130 is associated with a respective different person/location pair.

In at least some embodiments, a generalized statistical model 140 may include elements similar to those of personal statistical model 130, but in aggregated form. For example, a generalized statistical model 140 may include any or all of aggregated approach information, aggregated intent data, aggregated non-trajectory-based information, aggregated intent scores associated with historical approaches toward the access-controlled location, aggregated result data indicating whether or not persons entered the access-controlled location on various historical approaches, aggregated pattern information, aggregated trajectory cluster information, aggregated access group information, and a minimum confidence threshold for enabling access to the access-controlled location that is based on aggregated data across various historical approaches by multiple persons.

In some embodiments, data representing multiple approaches by a given person toward a particular access-controlled location on similar trajectories may be clustered into fewer trajectory data elements in a personal statistical model 130 for the given person, thus saving memory and reducing the number of trajectory comparisons that are made by the intent prediction processing unit for a given personalized intent prediction. For example, a personal statistical model 130 for a given person may include data representing multiple similar trajectories that are associated with respective historical approaches by the given person toward a particular access-controlled location and identical result data, and that are aggregated into respective ones of one or more cluster of trajectories based on obtained non-trajectory-based information associated with the given person. In this example, to determine a personalized intent score for a current approach by the given person toward the access-controlled location, the intent prediction processing unit may compare intent data associated with the current approach with data representing at least one of the one or more clusters of trajectories.

In some embodiments, personal statistical models 130 may be maintained only for individual persons whose behaviors when intending to enter a particular access-controlled location or when not intending to enter a particular access-controlled location, in at least some circumstances, are different than those of other persons who are authorized to enter the access-controlled location. For example, if a given person's behavior with respect to a first access-controlled location follows patterns of behavior observed in aggregated data for multiple persons, intent prediction processing unit 120 may compare intent data and non-trajectory-based information associated with a current approach toward the first access-controlled location with data in a generalized statistical model 140 associated with the first access-controlled location, rather than with data in a personal statistical model 130 for the given person, and may calculate an intent score based on that comparison. However, if the given person's behavior with respect to a second access-controlled location does not follow patterns of behavior observed in aggregated data for multiple persons, intent prediction processing unit 120 may compare intent data and non-trajectory-based information associated with a current approach toward the second access-controlled location with data in a personal statistical model 130 for the given person rather than data in a generalized statistical model 140 associated with the second access-controlled location, and may calculate an intent score based on that comparison. In one example, the generalized statistical model 140 may be built by creating entries for trajectories that resulted in a person entering a particular access-controlled location and entries for trajectories that resulted in a person failing to enter the particular access-controlled location and using trajectory clustering to find typical paths for each case. In some embodiments, the generalized statistical model may store data indicating the identifiers of the persons who follow each of the typical paths, as well as data indicating the identifiers of persons who do not follow the typical paths.

In some embodiments, if a given person's behavior with respect to their intent to enter a particular access-controlled location is drastically different on different days of the week or at different times of day, such as in the morning versus in the afternoon, separate instances of personal statistical model 130 may be maintained for these different scenarios and the instance of the personal statistical model 130 used by intent prediction processing unit 120 in performing personalized intent prediction for a current approach by the give person may be dependent on which instance of the personal statistical model 130 corresponds to the day of the week or the time of day associated with the current approach. In some embodiments, a personal statistical model 130 may include exit information indicating when a given person exits a particular access-controlled location associated with the personal statistical model 130. In some such embodiments, detecting patterns in the given person's behavior may be based on both this exit information and access logs stored as result data in the personal statistical model 130. For example, a detected pattern may indicate that the given person typically exits the access-controlled location for lunch or a coffee break on a fairly consistent schedule and typically returns from such breaks within a fairly consistent window of time after exiting. In this example, if the given person approaches the access-controlled location after exiting at a break time associated with this detected pattern, returning within the window of time associated with this detected pattern, the intent prediction processing unit may calculate a relatively high intent score for the current approach.

In some embodiments, when a given person for whom no personal statistical model was previously created approaches an access-controlled location, an intent prediction processing unit may compare intent data and non-trajectory-based information associated with the current approach by the given person toward the access-controlled location with data in a generalized statistical model 140 associated with the access-controlled location and an intent score may be determined based at least on the comparison. If the given person's behavior follows patterns of behavior observed in aggregated data for multiple persons as reflected in the generalized statistical model 140, no personal statistical model may be created for the given person. However, if the given person's behavior does not follow patterns of behavior observed in the aggregated data for multiple persons as reflected in the generalized statistical model 140, a personal statistical model may be created for the given person. In some embodiments, a personal statistical model may be created for each given person, or for each given person/location pair, if none exists at the time of an approach by the given person toward the access-controlled location, regardless of whether or not the given person's behavior follows patterns of behavior observed in aggregated data for multiple persons as reflected in a generalized statistical model 140. In some embodiments, creating a personal statistical model for a given person or for a given person/location pair, may include identifying the given person and associating the personal statistical model with data indicating the identity of the given person. In some embodiments, an intent prediction processing unit may determine a personalized intent score for a given person/location pair based on data in a generalized statistical model 140 and further based other information specific to the person or to the current approach, which may include current gaze data, current pose data, or non-trajectory information associated with the given person or the current approach, as described herein.

FIGS. 5A through 5H illustrate example trajectories of a person on respective approaches toward an access-controlled location, in accordance with some embodiments. More specifically, each of FIGS. 5A through 5H illustrates a facility 500 that includes an access-controlled location 505 and two other locations shown as 515 and 525. An entry to access-controlled location 505 is shown as door 510. In some embodiments, one or more of locations 515 and 525 may also be access-controlled locations. However, the descriptions of FIGS. 5A through 5H that follow are primarily directed to personalized intent prediction for a person 501 with respect to various approaches toward access-controlled location 505. In these descriptions, it may be assumed that the identity of person 501 is known and that person 501 is authorized to enter access-controlled location 505.

In the illustrated embodiments, an image capture device associated with access-controlled location 505 is shown as video camera 520. In at least some embodiments, video camera 520 may be a multi-sensor camera positioned beside or above door 510 and having respective different camera heads aimed along one or more of the illustrated hallways. Video camera 520 may be configured to capture a video stream depicting the behavior of person 501 on approach toward access-controlled location 505. In one example embodiment, video camera 520 may capture the video stream at a rate of 10 frames per second. Therefore, if person 501 is visible in every frame captured by video camera 520 for 5 seconds while on approach toward access-controlled location 505, there will be 50 frames in the video stream for which trajectory information, including respective locations and motion data, may be generated by an intent prediction processing unit, such as intent prediction processing unit 120 illustrated in FIG. 1, and associated with person 501 and with the approach. In this example, the trajectory of person 501 may be modeled as a series of 50 points which, after a curve fitting operation, may represent a smooth path taken by person 501 while on the approach. In other embodiments, an image capture device associated with access-controlled location 505 may be or include a camera configured to capture a sequence of still images that collectively depict the behavior of person 501 on approach toward access-controlled location 505.

Figure 5A:
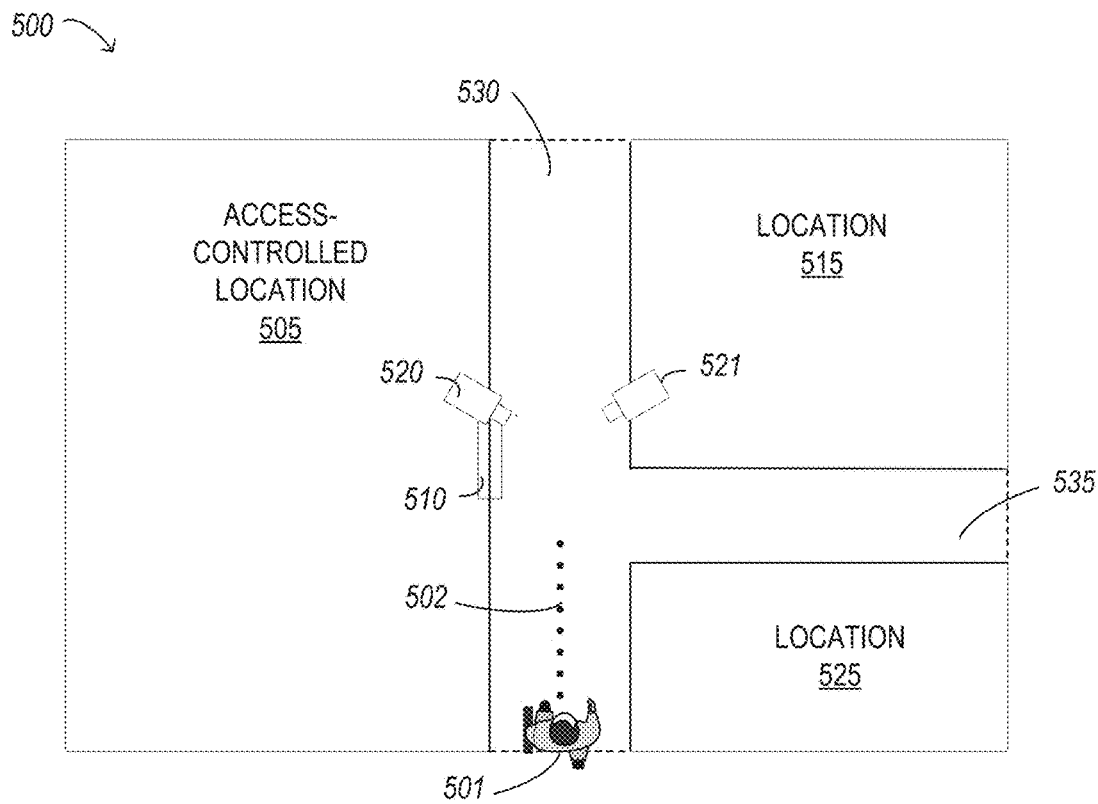
FIGS. 5A through 5H illustrate example trajectories of a person on respective approaches toward an access-controlled location, in accordance with some embodiments.

In the illustrated examples, it may be assumed that video camera 520 has a field of view that includes all of the hallway 530 that passes by door 510 of access-controlled location 505 and all or a portion of hallway 535. As illustrated in FIG. 5A, in some embodiments, an image capture device 521 associated with access-controlled location 505 may be positioned opposite door 510 and with a view of door 510 and all of the hallway 530 that passes by door 510 and may be configured to capture a video stream depicting the behavior of person 501 on approach toward location 505 instead of, or in addition to, video camera 520. Video camera 521 may also have a field of view that includes all or a portion of hallway 535. In at least some embodiments, once person 501 is detected in a video stream captured by video camera 520, identified, and determined to be authorized to enter access-controlled location 505, the video stream captured by video camera 520 and provided to intent prediction processing unit 120 may be analyzed to track the trajectory of person 501 and to predict whether person 501 intends to enter access-controlled location 505 on the current approach. In some embodiments, the video stream captured by video camera 520 and provided to intent prediction processing unit 120 may also be analyzed to determine result data indicating whether or not person 501 actually entered access-controlled location 505 on the current approach. In other embodiments, result data for the current approach may be determined based on access logs associated with access-controlled location 505 instead of, or in conjunction with, the captured video stream.

FIG. 5A illustrates a scenario in which person 501 has begun an approach toward door 510 of access-controlled location 505 on trajectory 502. In this scenario, person 501 is alone in approaching door 510. An initial portion of trajectory 502 takes person 501 from a first end of hallway 530 toward door 510 near the center of hallway 530.

In this scenario, video camera 520 may capture image data depicting the behavior of person 501 as they approach door 510. The captured image data may be provided to intent prediction processing unit 120. In some embodiments, the captured image data may be provided to an authentication system, such as authentication system 150 illustrated in FIG. 1. In some embodiments, authentication system 150 may authenticate person 501 using a facial-recognition-based single factor authentication process or a facial-recognition-based multi-factor authentication process, or using other means, such as by detecting and recognizing a mobile phone or other portable device carried by person 501 through a Bluetooth connection, by detecting a badge, fob, or other item worn or carried by person 501 that includes an RFID tag using an RFID reader, or by biometrics means other than facial recognition. In some embodiments, intent prediction system may refrain from tracking the trajectory of person 501 until and unless person 501 is identified, authenticated, and determined to be authorized to enter access-controlled location 505.

As described herein, intent prediction processing unit 120 may generate, based on the received video stream, intent data including trajectory information describing trajectory 502. The intent data may also include gaze data, pose data, or other behavioral information associated with the current approach of person 501 on trajectory 502. In addition, intent prediction processing unit 120 may also obtain non-trajectory-based information associated with person 501, including any of the types of non-trajectory-based information described herein. Intent prediction processing unit 120 may compare the intent data associated with the current approach and non-trajectory-based information associated with person 501 to information in a personal statistical model for person 501 and may generate a personalized intent score for person 501 indicating the likelihood that person 501 will enter door 510 on the current approach based on the comparison. As described in detail herein, the personalized intent score may inform a decision, by an access control system to pre-emptively enable access to access-controlled location 505 through door 510 prior to person 501 reaching door 510 or to refrain from pre-emptively enable access to access-controlled location 505 through door 510 prior to person 501 reaching door 510.

The intent data, non-trajectory-based information, personalized intent score, and result data indicating whether or not person 501 entered determine whether person 501 entered access-controlled location 505 through door 510 may be stored in association with an identifier of person 501 in an entry for the approach in a personal statistical model for person 501. In some embodiments, the information in the approach entry may be used to update and improve a machine learning algorithm for personalized intent prediction or other information stored in the personal statistical model for person 501.

Figure 5B:
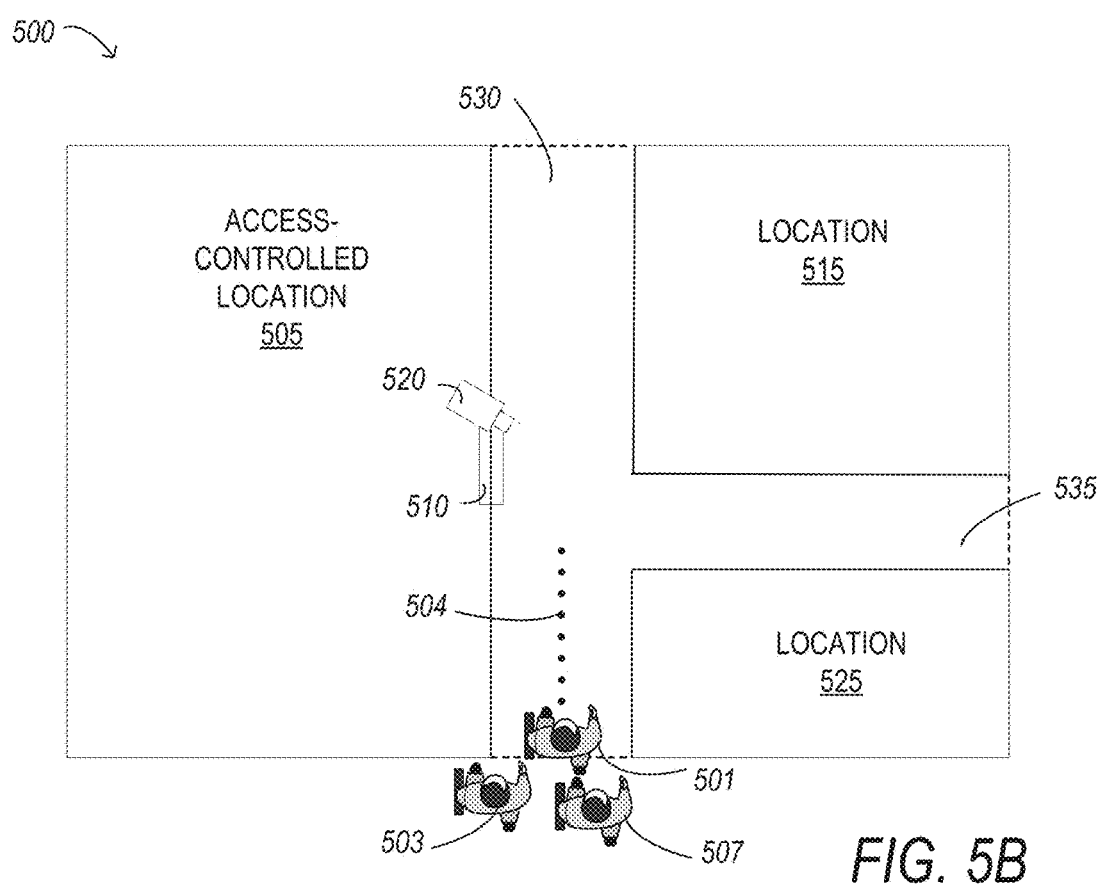

FIG. 5B illustrates a scenario in which person 501 has begun an approach toward door 510 of access-controlled location 505 on trajectory 502 accompanied by two additional persons, shown as person 503 and person 507. An initial portion of trajectory 504 takes person 501, along with person 503 and person 507, from a first end of hallway 530 toward door 510 near the center of hallway 530. As in the scenario illustrated in FIG. 5A, video data captured by video camera 520 may be provided to intent prediction processing unit 120, which may generate a personalized intent score, as described above. However, unlike in existing intent prediction systems that rely only on aggregated trajectory information, even though trajectory 504 is similar to trajectory 502, the personalized intent score generated by intent prediction processing unit 120 may be different than the personalized intent score generated in the scenario illustrated in FIG. 5A based at least on the presence or the respective identities of persons 503 and 507 on the current approach. Differences in the personalized intent scores generated in the scenarios illustrated in FIGS. 5A and 5B may also be based on differences in gaze data or pose data associated with the scenarios, differences in respective temporal information associated with the scenarios, differences in pattern information associated with the scenarios, differences in contextual information associated with the scenarios, or other factors that distinguish the two scenarios from each other.

Figure 5C:
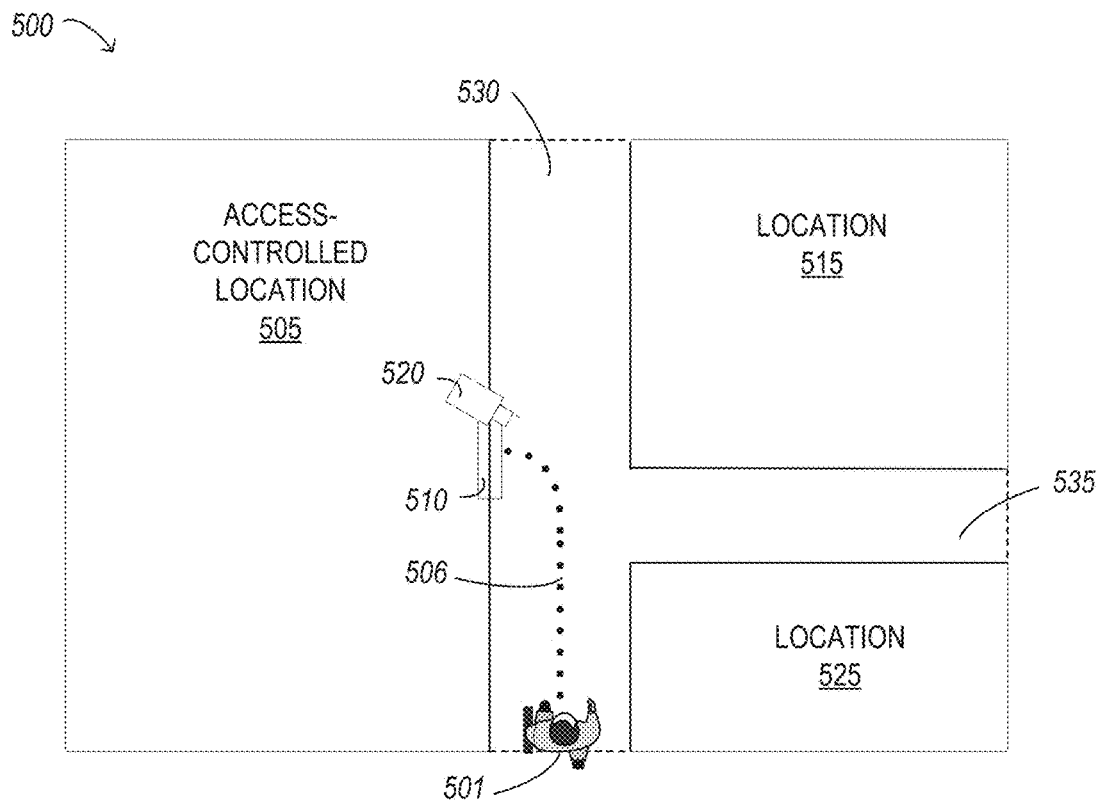

FIG. 5C illustrates a scenario in which person 501 completes a current approach on trajectory 506 by entering door 510. In this example, a first portion of trajectory 506 is similar to trajectories 502 and 504 shown in FIGS. 5A and 5B, respectively. In this example, if intent prediction processing unit 120 correctly predicted that person 501 intended to enter access-controlled location 505 through door 510 by generating a personalized intent score that meets or exceeds a predetermined minimum confidence threshold for enabling entry, door 510 may have been pre-emptively unlocked or opened prior to person 501 reaching door 510, resulting in a smooth and frictionless entry into access-controlled location 505 by person 501.

However, if intent prediction processing unit 120 incorrectly predicted that person 501 did not intend to enter access-controlled location 505 through door 510 by generating a personalized intent score that does not meet or exceed the predetermined minimum confidence threshold for enabling entry, door 510 may not have been unlocked or opened prior to person 501 reaching door 510. In this case, person 501 may have had to provide a more definitive indication of intent, such as any of those described herein, to trigger the unlocking or opening of door 510. In either case, result data indicating that person 501 entered access-controlled location 505 through door 510, the personalized intent score, and some or all of the information considered when generating the personalized intent score may be stored in association with an identifier of person 501 in an entry for the approach in a personal statistical model for person 501 and may be used to update and improve a machine learning algorithm for personalized intent prediction or other information stored in the personal statistical model for person 501.

Figure 5D:
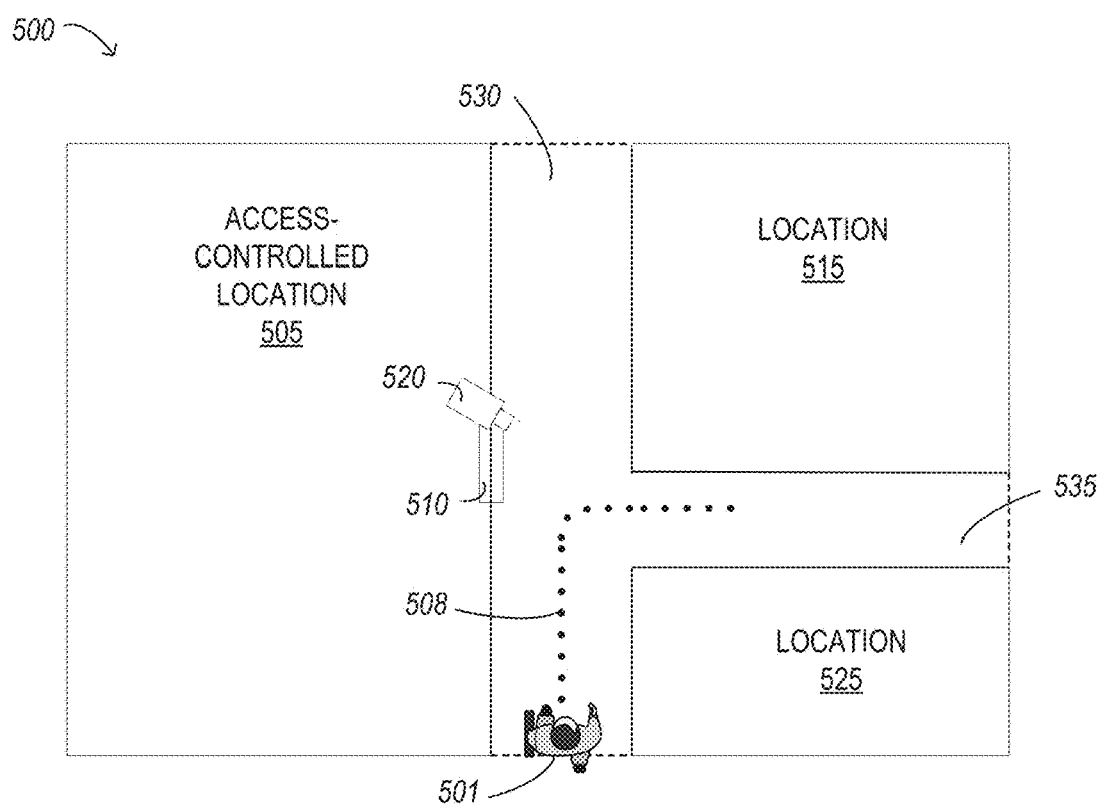

FIG. 5D illustrates a scenario in which person 501 completes a current approach on trajectory 508 by turning down hallway 535, rather than entering door 510. In this example, a first portion of trajectory 508 is similar to trajectories 502 and 504 and to the first portion of trajectory 506, shown in FIGS. 5A, 5B, and 5C, respectively. However, in this example, the personalized intent score generated by intent prediction processing unit 120 may be different than the personalized intent score generated in the scenario illustrated in FIG. 5C. In various embodiments, the differences in the personalized intent scores generated in the scenarios illustrated in FIGS. 5C and 5D may be based on differences in gaze data or pose data associated with the scenarios, differences in respective temporal information associated with the scenarios, differences in pattern information associated with the scenarios, differences in contextual information associated with the scenarios, or other factors that distinguish the two scenarios from each other. In this example, if intent prediction processing unit 120 correctly predicted that person 501 did not intend to enter access-controlled location 505 through door 510 by generating a personalized intent score that does not meet or exceed the predetermined minimum confidence threshold for enabling entry, door 510 may not have been unlocked or opened prior to person 501 reaching door 510. In this case, person 501 may have had to provide a more definitive indication of intent, such as any of those described herein, to trigger the unlocking or opening of door 510.

However, if intent prediction processing unit 120 incorrectly predicted that person 501 intended to enter access-controlled location 505 through door 510 by generating a personalized intent score that meets or exceeds a predetermined minimum confidence threshold for enabling entry, door 510 may have been pre-emptively unlocked or opened prior to person 501 reaching door 510, resulting in potential security breach if a second person who is not authorized to enter access-controlled location 505 is able to enter door 510 before door 510 is closed or re-locked and while the second person is out of sight of person 501. In either case, result data indicating that person 501 did not enter access-controlled location 505 through door 510, the personalized intent score, and some or all of the information considered when generating the personalized intent score may be stored in association with an identifier of person 501 in an entry for the approach in a personal statistical model for person 501 and may be used to update and improve a machine learning algorithm for personalized intent prediction or other information stored in the personal statistical model for person 501.

Figure 5E:
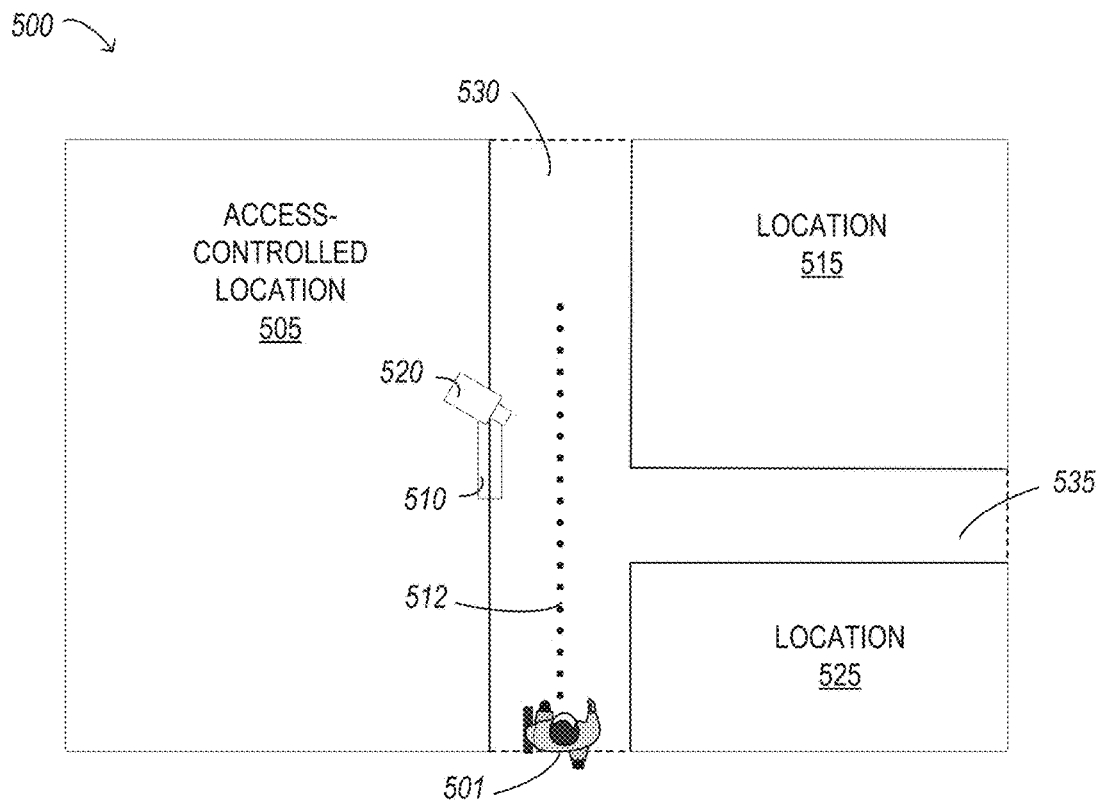

FIG. 5E illustrates a scenario in which person 501 completes a current approach on trajectory 512 by continuing down hallway 530, passing door 510 without entering access-controlled location 505. In this example, a first portion of trajectory 512 is similar to trajectories 502 and 504 and to the first portions of trajectories 506 and 508, shown in FIGS. 5A through 5D, respectively. However, in this example, the personalized intent score generated by intent prediction processing unit 120 may be different than the personalized intent scores generated in the scenarios illustrated in FIGS. 5C and 5D. In various embodiments, the differences in the personalized intent scores generated in the scenarios illustrated in FIGS. 5C, 5D and 5E may be based on differences in gaze data or pose data associated with the scenarios, differences in respective temporal information associated with the scenarios, differences in pattern information associated with the scenarios, differences in contextual information associated with the scenarios, or other factors that distinguish the three scenarios from each other. In this example, if intent prediction processing unit 120 correctly predicted that person 501 did not intend to enter access-controlled location 505 through door 510 by generating a personalized intent score that does not meet or exceed the predetermined minimum confidence threshold for enabling entry, door 510 may not have been unlocked or opened prior to person 501 reaching door 510. In this case, person 501 may have had to provide a more definitive indication of intent, such as any of those described herein, to trigger the unlocking or opening of door 510.

However, if intent prediction processing unit 120 incorrectly predicted that person 501 intended to enter access-controlled location 505 through door 510 by generating a personalized intent score that meets or exceeds a predetermined minimum confidence threshold for enabling entry, door 510 may have been pre-emptively unlocked or opened prior to person 501 reaching door 510, resulting in potential security breach if a second person who is not authorized to enter access-controlled location 505 is able to enter door 510 before door 510 is closed or re-locked and while the second person is out of sight of person 501. In either case, result data indicating that person 501 did not enter access-controlled location 505 through door 510, the personalized intent score, and some or all of the information considered when generating the personalized intent score may be stored in association with an identifier of person 501 in an entry for the approach in a personal statistical model for person 501 and may be used to update and improve a machine learning algorithm for personalized intent prediction or other information stored in the personal statistical model for person 501.

Figure 5F:
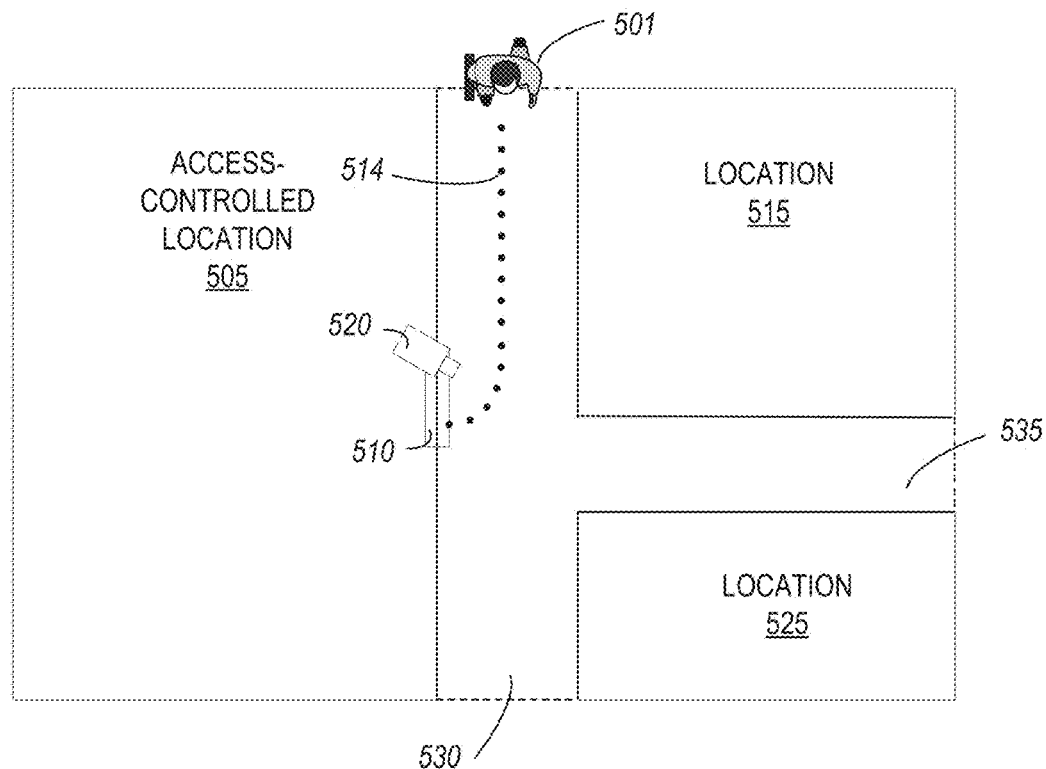

FIG. 5F illustrates a scenario in which person 501 approaches door 510 of access-controlled location 505 from a second end of hallway 530 on trajectory 514. In this scenario, person 501 is alone in approaching door 510 and completes the current approach on trajectory 514 by entering door 510 near the center of hallway 530. In this example, the personalized intent score generated by intent prediction processing unit 120 may be different than the personalized intent scores generated in the scenarios illustrated in FIGS. 5A through 5E based at least on the fact that person 501 approaches door 510 from the opposite end of hallway 530. Differences in the personalized intent scores generated in the scenarios illustrated in FIGS. 5A through 5F may also be based on differences in gaze data or pose data associated with the scenarios, differences in respective temporal information associated with the scenarios, differences in pattern information associated with the scenarios, differences in contextual information associated with the scenarios, or other factors that distinguish these scenarios from each other.

In this example, if intent prediction processing unit 120 correctly predicted that person 501 intended to enter access-controlled location 505 through door 510 by generating a personalized intent score that meets or exceeds a predetermined minimum confidence threshold for enabling entry, door 510 may have been pre-emptively unlocked or opened prior to person 501 reaching door 510, resulting in a smooth and frictionless entry into access-controlled location 505 by person 501.

However, if intent prediction processing unit 120 incorrectly predicted that person 501 did not intend to enter access-controlled location 505 through door 510 by generating a personalized intent score that does not meet or exceed the predetermined minimum confidence threshold for enabling entry, door 510 may not have been unlocked or opened prior to person 501 reaching door 510. In this case, person 501 may have had to provide a more definitive indication of intent, such as any of those described herein, to trigger the unlocking or opening of door 510. In either case, result data indicating that person 501 entered access-controlled location 505 through door 510, the personalized intent score, and some or all of the information considered when generating the personalized intent score may be stored in association with an identifier of person 501 in an entry for the approach in a personal statistical model for person 501 and may be used to update and improve a machine learning algorithm for personalized intent prediction or other information stored in the personal statistical model for person 501.

Figure 5G:
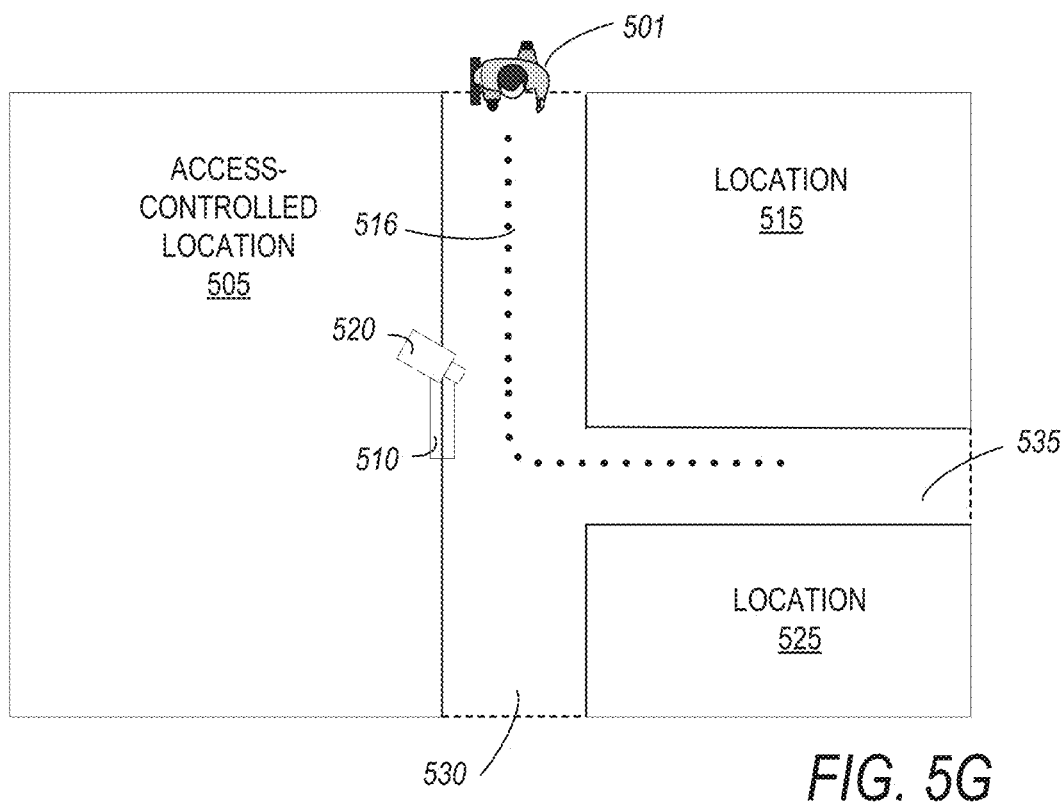

FIG. 5G illustrates a scenario in which person 501 completes a current approach on trajectory 516 by turning down hallway 535, rather than entering door 510. In this example, a first portion of trajectory 516 is similar to the first portion of trajectory 514, shown in FIG. 5F. However, in this example, the personalized intent score generated by intent prediction processing unit 120 may be different than the personalized intent score generated in the scenario illustrated in FIG. 5F. In various embodiments, the differences in the personalized intent scores generated in the scenarios illustrated in FIGS. 5F and 5G may be based on differences in gaze data or pose data associated with the scenarios, differences in respective temporal information associated with the scenarios, differences in pattern information associated with the scenarios, differences in contextual information associated with the scenarios, or other factors that distinguish the two scenarios from each other. In this example, if intent prediction processing unit 120 correctly predicted that person 501 did not intend to enter access-controlled location 505 through door 510 by generating a personalized intent score that does not meet or exceed the predetermined minimum confidence threshold for enabling entry, door 510 may not have been unlocked or opened prior to person 501 reaching door 510. In this case, person 501 may have had to provide a more definitive indication of intent, such as any of those described herein, to trigger the unlocking or opening of door 510.

However, if intent prediction processing unit 120 incorrectly predicted that person 501 intended to enter access-controlled location 505 through door 510 by generating a personalized intent score that meets or exceeds a predetermined minimum confidence threshold for enabling entry, door 510 may have been pre-emptively unlocked or opened prior to person 501 reaching door 510, resulting in potential security breach if a second person who is not authorized to enter access-controlled location 505 is able to enter door 510 before door 510 is closed or re-locked and while the second person is out of sight of person 501. In either case, result data indicating that person 501 did not enter access-controlled location 505 through door 510, the personalized intent score, and some or all of the information considered when generating the personalized intent score may be stored in association with an identifier of person 501 in an entry for the approach in a personal statistical model for person 501 and may be used to update and improve a machine learning algorithm for personalized intent prediction or other information stored in the personal statistical model for person 501.

Figure 5H:
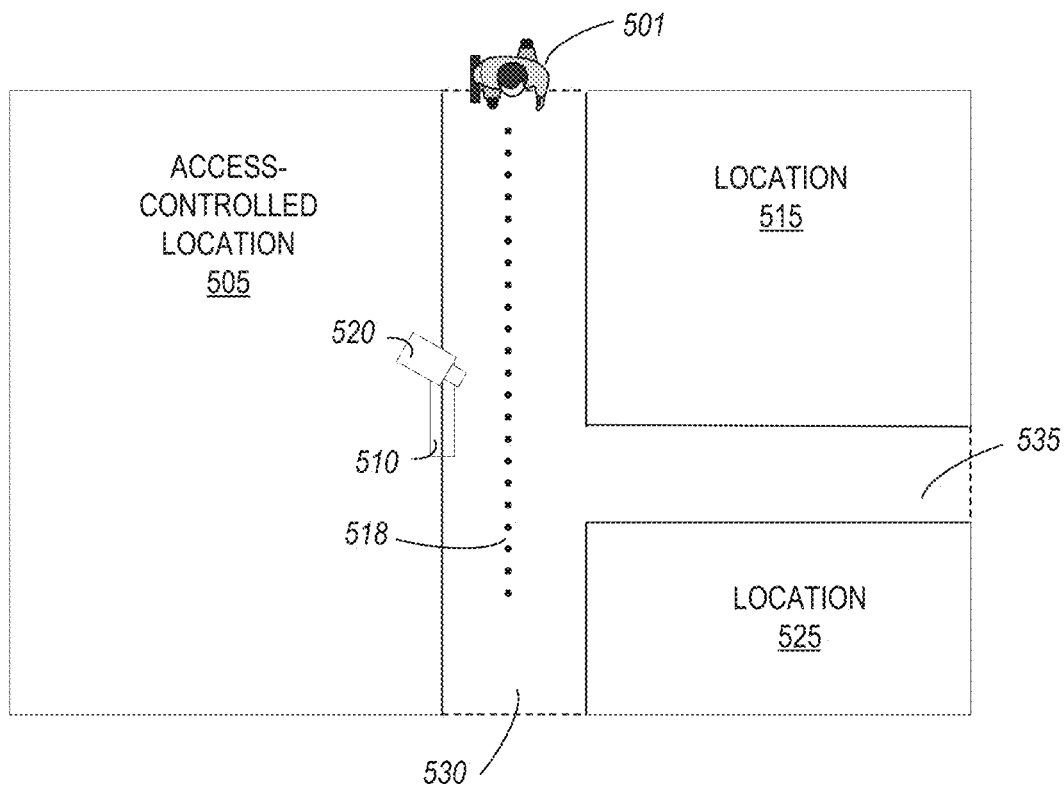

FIG. 5H illustrates a scenario in which person 501 completes a current approach on trajectory 518 by continuing down hallway 530, passing door 510 without entering access-controlled location 505. In this example, a first portion of trajectory 518 is similar to the first portion of trajectories 514 and 516, shown in FIGS. 5F and 5G, respectively. However, in this example, the personalized intent score generated by intent prediction processing unit 120 may be different than the personalized intent scores generated in the scenarios illustrated in FIGS. 5F and 5G. In various embodiments, the differences in the personalized intent scores generated in the scenarios illustrated in FIGS. 5F, 5G and 5H may be based on differences in gaze data or pose data associated with the scenarios, differences in respective temporal information associated with the scenarios, differences in pattern information associated with the scenarios, differences in contextual information associated with the scenarios, or other factors that distinguish the three scenarios from each other. In this example, if intent prediction processing unit 120 correctly predicted that person 501 did not intend to enter access-controlled location 505 through door 510 by generating a personalized intent score that does not meet or exceed the predetermined minimum confidence threshold for enabling entry, door 510 may not have been unlocked or opened prior to person 501 reaching door 510. In this case, person 501 may have had to provide a more definitive indication of intent, such as any of those described herein, to trigger the unlocking or opening of door 510.

However, if intent prediction processing unit 120 incorrectly predicted that person 501 intended to enter access-controlled location 505 through door 510 by generating a personalized intent score that meets or exceeds a predetermined minimum confidence threshold for enabling entry, door 510 may have been pre-emptively unlocked or opened prior to person 501 reaching door 510, resulting in potential security breach if a second person who is not authorized to enter access-controlled location 505 is able to enter door 510 before door 510 is closed or re-locked and while the second person is out of sight of person 501. In either case, result data indicating that person 501 did not enter access-controlled location 505 through door 510, the personalized intent score, and some or all of the information considered when generating the personalized intent score may be stored in association with an identifier of person 501 in an entry for the approach in a personal statistical model for person 501 and may be used to update and improve a machine learning algorithm for personalized intent prediction or other information stored in the personal statistical model for person 501.

In some scenarios, not shown in FIGS. 5A through 5H, person 501 may approach access-controlled location 505 from hallway 535 and intent prediction processing unit 120 may generate a personalized intent score indicating a likelihood that person 501 intends to enter access-controlled location 505 through door 510. In one example, video camera 520, video camera 521, or another image capture device associated with access-controlled location 505 (not shown in FIGS. 5A through 5H) may be positioned and configured to capture person 501 on approach toward location 505 from hallway 535 and the intent prediction processing unit may be configured to generate a personalized intent score based on the captured image data.

In embodiments in which one or more of location 515 and location 525 is an access-controlled location, operations similar to those described above in reference to FIGS. 5A through 5H may be performed to generate personalized intent scores for persons approaching these locations based on image data captured by and received from respective cameras positioned and configured to observe persons approaching doors or other entry points of these locations.

FIG. 6 is a block diagram illustrating selected elements of an intent prediction processing unit 120 configured for personalized intent prediction and for training a neural network or machine learning model to perform such predictions, in accordance with some embodiments. In some embodiments, intent prediction processing unit 120 may be similar to intent prediction processing unit 120 illustrated in FIG. 1. In the illustrated example, intent prediction processing unit 120 includes a Read Only Memory (ROM) 610, a Random Access Memory (RAM) 620, an electronic processor 630, one or more input/output device interfaces 640 for communicating with locally attached devices and components, and a network interface 650 for communicating with an access control system 660 or with a remote server or other remote device (not shown in FIG. 6), all of which are coupled to a system bus 605 through which they communicate with each other. In various embodiments, the electronic processor 630 may include a microprocessor, a graphics processing unit, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 610 stores program instructions 615, at least some of which may be executed by the electronic processor 630 to perform some or all of the processes described herein. In some embodiments, intent prediction processing unit 120 may thus be configured to receive, store, and analyze image data captured by one or more image capture devices 110 and depicting the behavior of a person on a current approach toward a secure location or restricted equipment, to generate and store intent data associated with the person and the current approach, to obtain and store non-trajectory-based information associated with the person and the current approach, to generate and store a personalized intent score based on a personal statistical model for the person on approach, to enable access to the secure location or restricted equipment or refrain from enabling access based on the personalized intent score, to determine and store result data associated with the person and the current approach, to update at least one of the personal statistical model and a generalized statistical model based on the accuracy of the intent prediction, or to train a neural network or machine learning model to perform personalized intent prediction.

In some embodiments, at least some of the operations of process 200 illustrated in FIG. 2 and process 300 illustrated in FIG. 3 may be performed by program instructions 615 executing on electronic processor 630 of intent prediction processing unit 120. For example, program instructions 615 may, when executed by electronic processor 630, cause the intent prediction processing unit to receive, from an image capture device 110 associated with an access-controlled location via an input/output device interface 640, first image data depicting behavior of a first person on a current approach by the first person toward the access-controlled location, generating, based on the received first image data, first intent data including data representing a current trajectory of the first person toward the access-controlled location on the current approach, comparing the first intent data with a personal statistical model for the first person, the personal statistical model for the first person including data representing one or more trajectories associated with respective historical approaches by the first person toward the access-controlled location and respective result data indicating, for each of the one or more trajectories, whether the historical approach resulted in the first person entering the access-controlled location, determining, dependent on the comparing, a first personalized intent score for the first person, the first personalized intent score representing a likelihood that the first person intends to enter the access-controlled location on the current approach, and enabling entry to the access-controlled location in response to the first personalized intent score meeting or exceeding a predetermined minimum confidence threshold for enabling entry.

In another example, program instructions 615 may, when executed by electronic processor 630, cause the intent prediction processing unit 120 to detect a person on approach toward access-controlled location, to identify or authenticate the person on approach, to generate intent data based on image data depicting the behavior of the person on approach, to obtain non-trajectory-based information associated with the person on approach, to generate a personalized intent score based at least on a personal statistical model for the person on approach, the intent data, and the non-trajectory-based information, to enable entry or refrain from enabling entry based on the personalized intent score, to determine result data indicating whether person entered the access-controlled location, to store, in association with the person's id, the intent data, non-trajectory-based information, intent score data, and result data, and to update at least one of the personal statistical model and a generalized statistical model that includes aggregated intent data associated with multiple persons on historical approaches.

In some embodiments, program instructions 615 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 615 may include program instructions that when executed by electronic processor 630 implement other functionality features of a system for personalized intent prediction. For example, in some embodiments, program instructions 615 may, when executed by electronic processor 630, be operable to perform object detection to detect a person on approach toward a secure location or restricted equipment in the image data received from image capture devices 110 or facial recognition to identify particular human faces in the image data received from image capture devices 110.

In this example embodiment, RAM 620 may, from time to time, store program data 625 including, without limitation, received image data, intent data associated with a current approach by a person toward a secure location or restricted equipment, non-trajectory-based information associated with the current approach, copies or portions of personal statistical models 130 and/or generalized statistical models 140 being used for intent prediction, a personalized intent score for the current approach, or result data for the current approach. In some embodiments, RAM 620 may also store data used in performing other functions of the intent prediction processing unit 120. In some embodiments, RAM 620 may, from time to time, store local copies of all or a portion of program instructions 615 or other program instructions copied from ROM 610 or received over network interface 650.

In this example embodiment, input/output device interfaces 640 may include one or more analog input interfaces, such as one or more analog-to-digital (A/D) convertors, or digital interfaces for receiving signals or data from, and sending signals or data to, one or more input/output devices. In various embodiments, input/output device interfaces 640 may operate to receive user input, to provide system output, or a combination of both. For example, in some embodiments, input/output device interfaces 640 may include one or more output interfaces for providing commands or control signals to one or more image capture devices 110 to initiate image capture operations and one or more input interfaces for receiving image data from the image capture devices 110. In some embodiments, input/output device interfaces 640 may include one or more external memory interfaces through which intent prediction processing unit 120 may be coupled to an external memory 655. Such an external memory may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, or at certain times, some or all of certain personal statistical models 130 and/or generalized statistical models 140 may reside in an external memory rather than, or in addition to, residing in RAM 620 as elements of program data 625. In various embodiments, or at certain times, some or all of program data 625 may reside in external memory rather than, or in addition to, within RAM 620.

In the illustrated embodiment, one or more user input/output devices 670 may be used to provide user input to intent prediction processing unit 120 via input/output device interfaces 640 or to display a personalized intent score to a user. In various embodiments, a user input/output device 670 may include any of a variety of suitable mechanisms for receiving user input, such as for initializing and initiating a personalized intent prediction exercise or for initializing and initiating an exercise to train a neural network or machine learning model for personalized intent prediction, as described herein, such as, for example, a keyboard or keypad, a microphone, soft keys, icons, or soft buttons on a touch screen of a display, a scroll ball, a mouse, buttons, and the like. User input/output devices 670 may also include other input mechanisms, which for brevity are not described herein and which may be implemented in hardware, software, or a combination of both. In some embodiments, input/output device interfaces 640 may include a graphical user interface (GUI) generated, for example, by electronic processor 630 from program instructions 615 and program data 625 and presented on a display, enabling a user to interact with the display. In various embodiments, a user input/output device 670 may include any suitable display technology for presenting information to a user including, for example, a personalized intent score. As illustrated in FIG. 6, input/output device interfaces 640 may operate to receive image data from one or more image capture devices 110. In some embodiments, input/output device interfaces 640, rather than network interface 650, may operate to provide personalized intent scores to access control system 660 to inform decisions about when and whether to preemptively enable access to a secure location or restricted equipment prior to a person reaching the secure location or restricted equipment.

Network interface 650 may be a suitable system, apparatus, or device operable to serve as an interface between electronic processor 630 and a network. Network interface 650 may enable intent prediction processing unit 120 to communicate over a network using a suitable transmission protocol or standard, including, but not limited to, transmission protocols and standards enumerated below with respect to the discussion of the network. In some embodiments, network interface 650 may be communicatively coupled via a network to a network storage resource (not shown). The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages, which are generally referred to as data. The network may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network and its various components may be implemented using hardware, software, or any combination thereof. Network interface 650 may enable wired or wireless communications to and from intent prediction processing unit 120 and other elements of a system for access control that incorporates personalized intent prediction. In some embodiments, image data may also or alternatively be received over network interface 650 rather than via one of the input/output device interfaces 640. In some embodiments, network interface 650 may operate to provide personalized intent scores to access control system 660 to inform decisions about when and whether to pre-emptively enable access to a secure location or restricted equipment prior to a person reaching the secure location or restricted equipment.

As illustrated in FIG. 6, intent prediction processing unit 120 may have access to an external memory 655. In at least some embodiments, one or more personal statistical models 130 and one or more generalized statistical models 140 may, at least at certain times and under certain circumstances, be maintained in external memory 655 and may be accessed by intent prediction processing unit 120 via one of the input/output device interfaces 640.

In the embodiment illustrated in FIG. 6, and as shown in FIG. 1, an authentication system 150 may be communicably coupled to one or more image capture devices 110 and configured to determine whether a person on approach toward the secure location or restricted equipment is authorized to access the secure location or restricted equipment based on image data captured by and received from the image capture devices 110. In other embodiments, authentication of a given person on approach toward a secure location or restricted equipment may be performed by electronic processor 630 executing program instructions 615. In still other embodiments, an authentication system 150 may be accessed by intent prediction processing unit 120 over a communication network via network interface 650.

Systems and processes for personalized intent prediction may result in more accurate intent predications than existing intent prediction systems that assume all persons are likely to behave in the same way when in similar situations. Unlike in existing systems in which intent prediction is based on aggregated trajectory information for multiple, or all, users, intent prediction may be personalized based on personal statistical models that include historical trajectory information and other intent data for a given person when on approach to a particular access-controlled location, temporal information associated with historical approaches that did or did not result in the given person entering the access-controlled location, patterns of behaviors or typical sequences of events detected in information associated with historical approaches toward the access-controlled location, user group information, group access information, group approach information, and contextual information that provides clues as to the given person's intent with respect to entering the access-controlled location.

While example systems and processes for personalized intent prediction are primarily described herein in terms of their application to predicting intent to enter access-controlled locations, in other embodiments, these systems and processes may be applied to predict whether a given person intents to access a restricted computing system or other restricted equipment. For example, if a person identified by facial recognition technology is authorized to access restricted equipment, and if the personalized intent prediction system determines that the likelihood that the identified person intends to access the restricted equipment meets or exceeds a predetermined minimum confidence threshold, access to the restricted equipment may be pre-emptively enabled, automatically and in real time, prior to the identified person reaching the restricted equipment and without explicit action on the part of the identified person. Conversely, refraining from pre-emptively enabling access to the restricted equipment when the identified person does not intend to access the restricted equipment may improve security, and may reduce wear on mechanical parts of an access-control system associated with the restricted equipment.

As should be apparent from this detailed description, the operations and functions of the intent prediction processing unit are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations. For example, a human mind cannot interface directly with RAM or other digital storage, cannot transmit or receive electronic messages, electronically encoded video, electronically encoded still images, and the like, and cannot analyze the image data and other associated information described herein using personal statistical models of a neural network or machine learning models to implement personalized intent prediction for frictionless or contactless access control systems, among other features and functions set forth herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context. A device or structure that is "configured" in a certain way is configured in at least that way, but may also be configured in ways that are not listed.

It will be appreciated that some embodiments may be comprised of one or more generic or specialized processors, or "processing devices", such as microprocessors, GPUs, VPUs, digital signal processors, customized processors and field programmable gate arrays (FPGAs) and unique stored program instructions, including both software and firmware, that control the one or more processors to implement, in conjunction with certain non-processor circuits, some, most, or all of the functions of the processes or systems described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a non-transitory computer-readable storage medium having computer readable code stored thereon for programming a computer including for example, a processor, to perform a process as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Further, it is expected that one of ordinary skill, notwithstanding possibly significant effort and many design choices motivated by, for example, available time, current technology, and economic considerations, when guided by the concepts and principles disclosed herein will be readily capable of generating software instructions and programs and ICs with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer, such as through the Internet using an Internet Service Provider.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for personalized intent prediction, the method comprising:
   receiving, from an image capture device associated with an access-controlled location, first image data depicting behavior of a first person on a current approach by the first person toward the access-controlled location;
   generating, based on the received first image data, first intent data including data representing a current trajectory of the first person toward the access-controlled location on the current approach;
   comparing the first intent data with a personal statistical model for the first person, the personal statistical model for the first person including data representing one or more trajectories associated with respective historical approaches by the first person toward the access-controlled location and respective result data indicating, for each of the one or more trajectories, whether the historical approach resulted in the first person entering the access-controlled location;
   determining, dependent on the comparing, a first personalized intent score for the first person, the first personalized intent score representing a likelihood that the first person intends to enter the access-controlled location on the current approach; and
   enabling entry to the access-controlled location in response to the first personalized intent score meeting or exceeding a predetermined minimum confidence threshold for enabling entry.

2. The method of claim 1, wherein:
the method further comprises obtaining non-trajectory-based information associated with the first person; and
determining the first personalized intent score for the first person is further dependent on the obtained non-trajectory-based information associated with the first person.

3. The method of claim 2, wherein:
for each of the one or more trajectories associated with respective historical approaches by the first person toward the access-controlled location, the personal statistical model for the first person further includes one or more of:
  historical temporal information indicating a date associated with the historical approach, a day of the week associated with the historical approach, or a time of day associated with the historical approach;
  historical group approach information indicating whether any other person or persons accompanied the first person on the historical approach; and
  historical group identification information indicating a respective identity for each of one or more other persons who accompanied the first person on the historical approach; and
the obtained non-trajectory-based information associated with the first person includes one or more of:
  access group information indicating a group of users having common access rights with respect to the access-controlled location that includes the first person;
  current temporal information indicating a date associated with the current approach, a day of the week associated with the current approach, or a time of day associated with the current approach;
  current group approach information indicating whether any other person or persons accompany the first person on the current approach; and
  current group identification information indicating a respective identity for each of one or more other persons accompanying the first person on the current approach.

4. The method of claim 2, wherein the obtained non-trajectory-based information associated with the first person includes contextual information associated with the current approach by the first person, including one or more of:
  calendar information indicating that the first person is likely to be present in the access-controlled location at a given time;
  an email-based communication, text-based communication, or voice-based communication indicating that the first person is likely to be present in the access-controlled location at a given time; and
  a social media post indicating that the first person is likely to be present in the access-controlled location at a given time.

5. The method of claim 2, wherein:
the personal statistical model for the first person includes data representing multiple similar trajectories that are associated with respective historical approaches by the first person toward the access-controlled location and identical result data, and that are aggregated into respective ones of one or more cluster of trajectories based on the obtained non-trajectory-based information associated with the first person; and
comparing the first intent data with the personal statistical model for the first person comprises comparing the first intent data with data representing at least one of the one or more clusters of trajectories.

6. The method of claim 5, further comprising:
determining an update action with which to update the personal statistical model for the first person, wherein determining the update action comprises determining whether the first intent data, the non-trajectory-based information associated with the first person, and result data indicating whether or not the first person entered the access-controlled location on the current approach are similar to the data representing the multiple similar trajectories that are associated with respective historical approaches, non-trajectory-based information associated with the first person and with trajectories in a given one of the one or more clusters of trajectories, and result data associated with the data representing the multiple similar trajectories in the given cluster; and
performing the determined update action, wherein the determined update action comprises:
  aggregating the first intent data into the data representing the multiple similar trajectories in the given cluster; or
  creating a new cluster including the first intent data and including the non-trajectory-based information associated with the first person.

7. The method of claim 1, wherein the method further comprises, prior to generating the first intent data, one or more of:
  determining an identity of the first person; and
  determining that the first person is authorized to enter the access-controlled location.

8. The method of claim 1, wherein:
the first intent data further includes data representing a gaze or pose of the first person associated with the current approach by the first person toward the access-controlled location; and
the personal statistical model for the first person further includes data representing gazes or poses of the first person associated with the respective historical approaches by the first person toward the access-controlled location.

9. The method of claim 1, wherein the determined first personalized intent score is different than a generalized intent score determined for each of multiple persons other than the first person based on respective trajectories of the multiple other persons toward the access-controlled location on respective approaches that are similar to the current trajectory of the first person toward the access-controlled location on the current approach, the generalized intent score having been determined using a generalized statistical model in which the respective trajectories of the multiple other persons are aggregated in a cluster of trajectories associated with the respective approaches.

10. The method of claim 1, further comprising:
  receiving, from the image capture device associated with the access-controlled location, second image data depicting behavior of a second person on a current approach by the second person toward the access-controlled location;
  generating, based on the received second image data, second intent data including data representing a current trajectory of the current approach of the second person toward the access-controlled location, the current trajectory of the current approach of the second person being similar to the current trajectory of the current approach of the first person;
  comparing the second intent data with a personal statistical model for the second person;

determining, dependent on a result of comparing the second intent data with the personal statistical model for the second person, a second personalized intent score for the second person, the second personalized intent score representing a likelihood that the second person intends to enter the access-controlled location on the current approach; and refraining from enabling entry to the access-controlled location in response to the second personalized intent score failing to meet or exceed the predetermined minimum confidence threshold for enabling entry.

11. The method of claim 1, further comprising:
storing, in association with the first intent data, score data representing the first personalized intent score for the first person and result data indicating whether or not the first person entered the access-controlled location on the current approach; and
updating the personal statistical model for the first person based on the first intent data, the score data, and the result data.

12. The method of claim 11, wherein said comparing the first intent data with a personal statistical model for the first person, said determining a personalized intent score for the first person, and said updating the personal statistical model for the first person are performed using a neural network or machine learning model trained to implement personalized intent prediction.

13. A system for personalized intent prediction, the system comprising:
an image capture device associated with an access-controlled location;
a processor; and
a memory storing program instructions that when executed by the processor cause the processor to perform:
receiving, from the image capture device, first image data depicting behavior of a first person on a current approach by the first person toward the access-controlled location;
generating, based on the received first image data, first intent data including data representing a current trajectory of the first person toward the access-controlled location on the current approach;
comparing the first intent data with a personal statistical model for the first person, the personal statistical model for the first person including data representing one or more trajectories associated with respective historical approaches by the first person toward the access-controlled location and result data indicating, for each of the one or more trajectories, whether the historical approach resulted in the first person entering the access-controlled location;
determining, dependent on the comparing, a first personalized intent score for the first person, the first personalized intent score representing a likelihood that the first person intends to enter the access-controlled location on the current approach;
enabling entry to the access-controlled location in response to the first personalized intent score meeting or exceeding a predetermined minimum confidence threshold for enabling entry; and
refraining from enabling entry to the access-controlled location in response to the first personalized intent score failing to meet or exceed the predetermined minimum confidence threshold for enabling entry.

14. The system of claim 13, wherein:
when executed by the processor, the program instructions further cause the processor to perform obtaining non-trajectory-based information associated with the first person, including one or more of:
access group information indicating a group of users having common access rights with respect to the access-controlled location that includes the first person;
current temporal information indicating a date associated with the current approach, a day of the week associated with the current approach, or a time of day associated with the current approach;
current group approach information indicating whether any other person or persons accompany the first person on the current approach; and
current group identification information indicating a respective identity for each of one or more other persons accompanying the first person on the current approach;
for each of the one or more trajectories associated with respective historical approaches by the first person toward the access-controlled location, the personal statistical model for the first person further includes one or more of:
historical temporal information indicating a date associated with the historical approach, a day of the week associated with the historical approach, or a time of day associated with the historical approach;
historical group approach information indicating whether any other person or persons accompanied the first person on the historical approach; and
historical group identification information indicating a respective identity for each of one or more other persons who accompanied the first person on the historical approach; and
determining the first personalized intent score for the first person is further dependent on the obtained non-trajectory-based information associated with the first person.

15. The system of claim 14, wherein the obtained non-trajectory-based information associated with the first person includes contextual information associated with the current approach by the first person, including one or more of:
calendar information indicating that the first person is likely to be present in the access-controlled location at a given time;
an email-based communication, text-based communication, or voice-based communication indicating that the first person is likely to be present in the access-controlled location at a given time; and
a social media post indicating that the first person is likely to be present in the access-controlled location at a given time.

16. The system of claim 13, wherein:
the first intent data further includes data representing a gaze or pose of the first person associated with the current approach by the first person toward the access-controlled location; and
the personal statistical model for the first person further includes data representing gazes or poses of the first person associated with the respective historical approaches by the first person toward the access-controlled location.

17. The system of claim 13, wherein:
when executed by the processor, the program instructions further cause the processor to perform:
storing, in association with the first intent data, score data representing the first personalized intent score for the first person and result data indicating whether or not the first person entered the access-controlled location on the current approach; and updating the personal statistical model for the first person based on the first intent data, the score data, and the result data; and said comparing the first intent data with a personal statistical model for the first person, said determining a personalized intent score for the first person, and said updating the personal statistical model for the first person are performed using a neural network or machine learning model trained to implement personalized intent prediction.

18. A non-transitory, computer-readable storage medium having program instructions stored thereon that when executed by an electronic processor cause the electronic processor to perform:

receiving, from an image capture device associated with an access-controlled location, first image data depicting behavior of a first person on a current approach by the first person toward the access-controlled location;

generating, based on the received first image data, first intent data including data representing a current trajectory of the first person toward the access-controlled location on the current approach;

comparing the first intent data with a personal statistical model for the first person, the personal statistical model for the first person including data representing one or more trajectories associated with respective historical approaches by the first person toward the access-controlled location and result data indicating, for each of the one or more trajectories, whether the historical approach resulted in the first person entering the access-controlled location;

determining, dependent on the comparing, a first personalized intent score for the first person, the first personalized intent score representing a likelihood that the first person intends to enter the access-controlled location on the current approach;

enabling entry to the access-controlled location in response to the first personalized intent score meeting or exceeding a predetermined minimum confidence threshold for enabling entry; and refraining from enabling entry to the access-controlled location in response to the first personalized intent score failing to meet or exceed the predetermined minimum confidence threshold for enabling entry.

19. The non-transitory, computer-readable storage medium of claim 18, wherein:

when executed by the electronic processor, the program instructions further cause the electronic processor to perform obtaining non-trajectory-based information associated with the first person including one or more of:

access group information indicating a group of users having common access rights with respect to the access-controlled location that includes the first person;

current temporal information indicating a date associated with the current approach, a day of the week associated with the current approach, or a time of day associated with the current approach;

current group approach information indicating whether any other person or persons accompany the first person on the current approach;

current group identification information indicating a respective identity for each of one or more other persons accompanying the first person on the current approach; and contextual information associated with the current approach by the first person, including one or more of:

calendar information indicating that the first person is likely to be present in the access-controlled location at a given time;

an email-based communication, text-based communication, or voice-based communication indicating that the first person is likely to be present in the access-controlled location at a given time; and a social media post indicating that the first person is likely to be present in the access-controlled location at a given time;

for each of the one or more trajectories associated with respective historical approaches by the first person toward the access-controlled location, the personal statistical model for the first person further includes one or more of:

historical temporal information indicating a date associated with the historical approach, a day of the week associated with the historical approach, or a time of day associated with the historical approach;

historical group approach information indicating whether any other person or persons accompanied the first person on the historical approach; and historical group identification information indicating a respective identity for each of one or more other persons who accompanied the first person on the historical approach; and determining the first personalized intent score for the first person is further dependent on the obtained non-trajectory-based information associated with the first person.

20. The non-transitory, computer-readable storage medium of claim 18, wherein:

when executed by the electronic processor, the program instructions further cause the electronic processor to perform:

storing, in association with the first intent data, score data representing the first personalized intent score for the first person and result data indicating whether or not the first person entered the access-controlled location on the current approach; and updating the personal statistical model for the first person based on the first intent data, the score data, and the result data; and said comparing the first intent data with a personal statistical model for the first person, said determining a personalized intent score for the first person, and said updating the personal statistical model for the first person are performed using a neural network or machine learning model trained to implement personalized intent prediction.

* * * * *